United States Patent [19]
Sproull et al.

[11] Patent Number: 5,600,848
[45] Date of Patent: Feb. 4, 1997

[54] COUNTERFLOW PIPELINE PROCESSOR WITH INSTRUCTIONS FLOWING IN A FIRST DIRECTION AND INSTRUCTION RESULTS FLOWING IN THE REVERSE DIRECTION

[75] Inventors: Robert F. Sproull, Newton, Mass.; Ivan E. Sutherland, Santa Monica, Calif.

[73] Assignee: Sun Microsystems, Inc., Mountain View, Calif.

[21] Appl. No.: 477,533

[22] Filed: Jun. 7, 1995

Related U.S. Application Data

[63] Continuation of Ser. No. 140,655, Oct. 21, 1993.
[51] Int. Cl.⁶ ............................................. G06F 13/00
[52] U.S. Cl. ...................................... 395/800; 395/394
[58] Field of Search ............................... 395/375, 800, 395/200.15

[56] References Cited

U.S. PATENT DOCUMENTS

| | | |
|---|---|---|
| 3,166,715 | 1/1965 | Cogar . |
| 4,112,489 | 9/1978 | Wood . |
| 4,679,213 | 7/1987 | Sutherland ............................. 377/66 |
| 4,916,606 | 4/1990 | Yamaoka et al. . |
| 4,964,046 | 10/1990 | Mehrgardt et al. . |
| 4,991,078 | 2/1991 | Wilhelm et al. . |
| 4,996,661 | 2/1991 | Cox et al. . |
| 5,117,490 | 5/1992 | Duxbury et al. . |
| 5,123,108 | 6/1992 | Olson et al. . |
| 5,148,529 | 9/1992 | Ueda et al. . |
| 5,163,157 | 11/1992 | Yamaoka et al. . |
| 5,187,800 | 2/1993 | Sutherland . |
| 5,269,007 | 12/1993 | Hanawa et al. . |
| 5,289,577 | 2/1994 | Gonzales et al. . |
| 5,386,563 | 1/1995 | Thomas ................................. 395/650 |
| 5,386,585 | 1/1995 | Traylor ................................. 395/800 |

FOREIGN PATENT DOCUMENTS

| | | |
|---|---|---|
| A0365188 | 10/1989 | European Pat. Off. . |
| A57139856 | 8/1982 | Japan . |

OTHER PUBLICATIONS

Karthik et al. "Interlock Schemes . . . " I.E.E.E. International conf. on computer design Nov. 1991.
Brunvand "The NSR Processor" I.E.E.E. Proceedings of 26th system sciences May 1993.
Paver et al. "Register Locking in an Asynchronous Microprocessor" I.E.E.E. Int. conf. on computer design Nov. 1992.
"Modular Technique . . . " IBM Technical Discloser Bulletin vol. 32 No. 7 Dec. 1989.
Why Systolic Architectures?, by H. T. Kang, Carnegie Mellon University, IEEE, Jan. 1982, pp. 300–309.
1992 International Conference on Computer Design, VSLI in Computers & Processors, Article entitled "Dynamic Reordering of High Latency Transactions Using a Modified Micropipeline", by A. Liebchen et al., Oct. 11, 1992.

(List continued on next page.)

*Primary Examiner*—William M. Treat
*Assistant Examiner*—Gautam R. Patel
*Attorney, Agent, or Firm*—James W. Rose; Lee Patch; Timothy J. Crean

[57] ABSTRACT

A general purpose computer capable of executing instructions of the type commonly found in multiple-address register-oriented instruction sets such as the SPARC instruction set is built from a counterflow pipeline. Communication in the pipeline flows both ways between adjacent stages and different stages in the pipeline are able to perform different instructions. Instructions flow through the pipeline in one direction, ("up") and the answers computed by previous instructions, called "results," flow in the other direction, ("down"). Comparison circuits in each stage of the pipeline permit instructions to select and copy the data values they need from the downward flowing stream of previously computed results. The comparison circuits also remove from the downward flowing stream previously computed results that would be rendered obsolete by execution of the present instruction.

60 Claims, 11 Drawing Sheets

OTHER PUBLICATIONS

Article entitled "Modular Technique for Constructing Control Logic of a Pipelined Processor", IBM Technical Disclosure Bulletin, vol. 32, No. 7, Dec. 1989, New York, U.S., pp. 403–425.

Article entitled "Mircopipelines", by Ivan E. Sutherland, Communications of the ACM, vol. 32, No. 6, Jun. 1989, pp. 720–738.

Superscalar Microprocessor Design, by Mike Johnson, AMD, 1991, pp. 10–11, 148–152, 157–158.

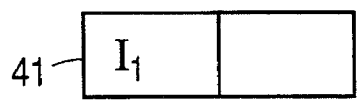
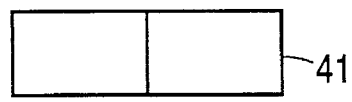
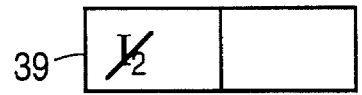
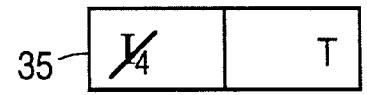
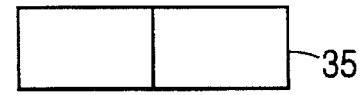
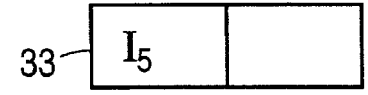
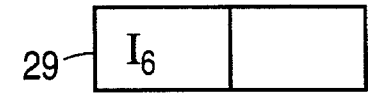
Figure 7A       Figure 7B

COUNTERFLOW PIPELINE PROCESSOR WITH INSTRUCTIONS FLOWING IN A FIRST DIRECTION AND INSTRUCTION RESULTS FLOWING IN THE REVERSE DIRECTION

This is a continuation of application Ser. No. 08/140,655, filed Oct. 21, 1993, STATUS.

BACKGROUND OF THE INVENTION

Pipeline Processors—RISC

Many modern microprocessors are designed using Reduced Instruction Set Computer (RISC) techniques. Such machines use a relatively simple instruction set but concentrate on executing those instructions very quickly. High speed operation is enhanced by use of a pipeline of about half a dozen stages.

Each instruction in sequence enters the pipeline and goes through various processing steps at each stage in the pipeline. In an early stage, for example, the instruction is decoded so that the actions of later pipeline stages for it become known. In another stage the data values required for the instruction are retrieved from the register file. In a later stage the arithmetic or logical operation required by the instruction is performed.

It is common in microprocessors to provide access to the register file at an early stage in the pipeline. This is done so that values from the register file required by an instruction can be delivered to the pipeline early in the process of performing an instruction. The speed of access to the register file is often a pacing item in the speed of the machine. Results computed later in the pipeline are returned to the register file for storage.

Bypass Paths

The process of moving all data through the register file has proven to be a bottleneck in the performance of microprocessors. Therefore, modern microprocessor designs use a complex set of "bypass" paths between stages in the pipeline to deliver values computed by one instruction to subsequent instructions. Thus, for example, if one instruction computes a value required as input to an instruction immediately following it, the value will be passed back one stage in the pipeline rather than circulating through the register file. Similarly, if the value is required by an instruction two instructions following, the value will be passed back two stages in the pipeline. A complex network of data paths is required to accommodate all possible needs of instructions for recently computed values. Design and management of a complex set of bypass paths has become a major task in the design of microprocessors. Because they pass by several stages in the pipeline, they will require wires longer than those normally connecting adjacent stages. Long wires have greater delay than the shorter wires connecting adjacent stages, which may degrade performance of the machine. Considerable effort may be required to accommodate the peculiar timing constraints of bypass paths. Second, because bypass communications in the pipeline may pass several stages, the timing of the stages connected by a bypass path must be carefully controlled. If there is a small timing error between adjacent stages, it may accumulate over the several stages around which the bypass passes to such an extent that it causes difficulty in the bypass communication. Third, should one part of the pipeline stall, i.e. be unable to continue without receipt of some essential item, all other parts of the pipeline must also stall, because the bypass paths would otherwise risk loss of data. The logic network that detects a stall condition in any part of the pipeline and transmits it to all parts to keep them in step often limits the performance of the computer. Finally, machines that use a multiplicity of bypass paths require switches to deliver the various bypass data from the various paths to the proper part of the processor. These switches themselves introduce not only delay in the processor but also complexity in the design.

Out of Order Execution

One way to enhance speed in a computer is to execute instructions out of order. As soon as enough is known to perform some instruction, the computer can do it, even though "previous" instructions have not yet been done. Nevertheless, such machines must produce the same results as would be produced by sequential execution of the instructions in the order written. The term "out of order execution" has come into use to describe any mechanism that is able to complete instructions in an order different from their order as presented by the program. Out of order execution can speed execution of a variety of programs that include floating point arithmetic instructions, or complicated and thus relatively slow numeric operations such as trigonometric functions. While the arithmetic operations are underway, other parts of the computer may do other, generally simpler, instructions out of order, completing as much work as possible in time that might otherwise be wasted.

Multiple Instruction Issue or Super-Scalar

Another way to enhance performance is called "multiple instruction issue", used in "super-scalar" machines. In a super-scalar machine, instructions are processed in groups rather than singly. Greater speed is achieved by using duplicate processing machinery in parallel rather than a single processing device sequentially.

It sometimes happens that the instructions in a group must interact. For example, the second instruction in a group may require a value computed by the first instruction in the group. Some computers provide communication paths between the parallel processing machinery to accommodate this kind of need. Other computers avoid this requirement by choosing to place in a group only instructions that have no mutual interaction. For example, some such computers can execute two instructions at a time, provided that one instruction requires only fixed point arithmetic and the other requires only floating point arithmetic.

Speculative Execution

Another useful mechanism for increasing performance is speculative execution. Although instructions to be performed by a computer are usually stored in consecutive cells in memory, some instructions, called "branch" instructions, direct the computer to take instructions from an entirely different location. Some branch instructions, called "conditional branches", direct the computer either to continue executing instructions in sequence or to take instructions from some other sequence, depending on the value of some data element that is computed.

In a high performance machine, the mechanism that fetches instructions from memory may be fetching instructions well before they are actually executed. The instructions that are fetched and not yet executed lie in a pipeline between the fetch unit and the place where they are actually executed. When the instruction fetch mechanism reaches a conditional branch, it may not know for certain which of the two possible next instructions to fetch. Knowledge of which is the proper next instruction may wait until the data element being tested by the conditional branch is actually calculated.

However, rather than waiting for this calculation, the instruction fetch units of many modern machines fetch instructions based on a guess of the outcome. Success rates of about 85% are achieved by relatively simple predictors known in the art. The fetch unit fetches instructions from the predicted location and issues them into the pipeline. Such instructions are called "speculative" because it is not certain that they should be executed at all. If the branch prediction is wrong, the speculatively issued instructions must be eliminated and all traces of their action reversed.

Register Renaming

In a simple computer design the computed values are stored in a register file. Values required as input for an instruction are fetched from the register file and computed values are returned to it. In more complex designs intermediate values are sometimes stored in temporary holding locations in order to save the time that would otherwise be used to move them to or from the register file. The control system for such a computer records both the value and the identity of the registers stored in the temporary holding locations. In effect, each temporary holding location may from time to time be identified with a different register from the register file. This mechanism is commonly known as "register renaming".

Register renaming ordinarily requires special design consideration. A designer must decide which temporary holding registers can be renamed, and how the identity of their contents will be recorded. A wide variety of complex mechanisms has been developed for this purpose.

Multiple Memory Issue

Another method used to speed the operation of modern computers is called multiple memory issue. In a simple memory system, values may be drawn from the memory one at a time. Each access to memory must complete before another can begin. In such a system the rate at which information can be drawn from the memory is limited by the access time of the memory.

Some modern machines improve on this rate of memory access by including special circuits that can accommodate more than one outstanding memory request at a time. Such circuits must include storage for the details of each memory request as well as control circuits to introduce them to and pass them through the memory system without interfering with each other. In order to simplify the memory control circuits it is customary for the memory to return its responses in the same sequence that they were requested.

Even more sophisticated memory systems are capable of out of order reply from the memory. Some memory requests may be satisfied by access to a fast cache memory, while others require recourse to the main memory system of the computer. The most sophisticated cotters put this difference in memo access time to use. They permit answers from memory that are available quickly to be used quickly even though previous requests of the memory are not yet complete. This is similar to out of order execution, but concerns the memory system rather than the arithmetic and logical parts of the computer.

Preserving the Programmer's Model

Great care must be exercised in the design of computers capable of multiple issue, out of order execution, speculative execution, register renaming, and multiple or out or order memory access to ensure correct execution of the instruction set. The instruction sets now in common use presume sequential execution of the instructions and presume that all computed values are produced and recorded in the order of the instructions that produce them. If one wishes to make a machine capable of higher speeds, one must exercise great care to ensure that its operation is compatible with programs initially intended for simpler machines.

The programmer thinks of the program as a sequence of instructions to be performed in the sequence he defines. A computer that does out of order execution must be designed to produce the same results as would be obtained by sequential operation. Usually this is easy, because any operations actually performed out of order must be independent of other instructions. Preserving compatibility with sequential operation is hard, however, when an instruction executed out of order produces some kind of fault. For example, if a branching decision instruction has already been executed when an instruction before it in sequence produces a memory fault, the effect of the branching decision instruction must be undone. Similarly, suppose a floating point divide instruction is launched, and instructions after it in the program are performed before the divide completes. If the divisor of the divide instruction is zero, an overflow results and instructions after the divide that were performed out of order must be undone. Preserving compatibility between computers that can execute instructions out of order and computers that perform in sequence has proven to be difficult, requiring complex circuits for many special cases of instruction sequences.

SUMMARY OF THE INVENTION

The present invention provides the benefits of Out-of-Order Execution, Super Scalar operation, Speculative Execution, Register Renaming, and Multiple Memory Issue, and resolves traps, exceptions and interrupts, in a simple and regular design that preserves the Programmer's Model.

Another patent application, "Counterflow Pipeline", filed on even date, commonly assigned herewith, and hereby incorporated by reference, describes a mechanism for sending information both ways through a single pipeline. Each data element flowing in one direction meets and may interact with each data element flowing in the other direction.

In the present disclosure, a counterflow pipeline is used to build a microprocessor. Instructions and the data for them flow upward and results from previous instructions flow downward. Instructions obtain source values from previous instructions by copying the result values from the downward flow of previously computed values. If necessary, values from a register file are inserted at the top of the downward flow to provide result values not otherwise available.

Each stage communicates mainly with its two adjacent stages, thus minimizing bypass paths common in today's microprocessors. A value computed by one instruction and required by an instruction two instructions later flows downward to reach it. Stages may differ in some details, e.g., the particular arithmetic or logical function that they perform, but will be similar in outline and use a similar control system, a similar set of and arrangement of storage registers, etc.

The simplicity of the present invention offers advantages in ease, cost and speed of design and debug. A single design for a stage control system, for example, can be reused in the many stages, thus getting a multiplier effect on the design effort. The integrated circuit technology in which these machines are built improves very rapidly. If it takes several years to complete a design, it is difficult to project the appropriate integrated circuit technology to use in the design. A shorter design cycle will permit more accurate targeting of the technology to use, and permit its practitioner to include more advanced features in the design. In addition, checking a conventional design may be as or more costly than making it. The simplicity of the present invention offers the opportunity to get the design correct more quickly than before.

Simplicity also contributes to the speed potential of the present invention. Circuits required for each stage are very simple, which should lead to rapid execution of instructions and high performance. Also, the regularity of the design allows its implementation as an integrated circuit to be geometrically regular. It will be possible to match the geometric width of the different stages, and then arrange the stages in a column, allowing communication paths between stages to be short and direct, leading to fast and low power operation.

In spite of its simple and regular design the present invention provides many of the advanced features found in the most sophisticated and complex of modern designs. These include:

Out of Order Execution

The present invention may complete instructions in an order other than the order in which they issue from the instruction memory to speed completion of a program by executing instructions as soon as the information they require is available. Nevertheless, the simple regular structure of the present invention retains compatibility with computers in which the instructions are executed in order. The simple structure replaces a host of complex methods heretofore used to accomplish this feat.

Speculative Execution and Traps

A simple mechanism in the present invention can clear unwanted instructions from the computing pipeline. This mechanism permits the computer to partially process instructions after a conditional branch on the speculation that the instructions chosen will, in fact, prove to be the correct ones. In the event that the instructions chosen for speculative execution should not have been executed, the clearing mechanism removes them and the results they have produced. Similarly, when an exceptional event such as an arithmetic or memory fault creates a trap condition, the effects of instructions following the one that caused the trap can easily be canceled.

Register Renaming

The present invention provides a simple and flexible way of storing the results of previous instructions without having to pass the answers through the register file with its attendant cost in speed. It delivers those results to new instructions using the reverse flow down a common pipeline. Because this simple mechanism provides temporary storage for several values that are "in process", it serves the role commonly known as "register renaming".

Multiple and Out of Order Memory Access

Finally, by bifurcating the counterflow pipeline, the present invention is able to accommodate not only multiple memory issue, but also out of order return from memory. This usually complex task is very much simplified by the strict geometric ordering imposed by the present invention on instructions coupled with the flexible attachment of the bifurcated pipelines.

The present invention provides an apparatus and method of operating a computing system in which instruction packages include source addresses and destination addresses, and in which result packages include destination addresses. Instruction packages flow up through stages of a bi-directional pipeline and result packages flow down through stages of the bi-directional pipeline. Instruction packages are maintained in a sequence in the upward flow that prevents them from exchanging relative position in said pipeline and result packages that contain the same destination address are maintained in a sequence in the downward flow that prevents them from exchanging relative position in said pipeline. The source address of each instruction package is compared with the destination address of each result package that it meets, and source values for the instruction package are retrieved from the result packages in response to said source/destination address comparison. The destination address of each instruction package is compared with the destination address of each result package that it meets, and any result value in the result package that has been or will be recomputed by the instruction package is nullified in response to the destination/destination address comparison. Result values are computed from source values and are supplied to a result package in the downward flow.

BRIEF DESCRIPTION OF THE DRAWINGS

FIG. 7A shows the state of a pipeline built according to the present invention shortly after a trap has occurred indicating which instructions are still valid.

FIG. 7B shows the state of such a pipeline after the trap result package has moved through the pipeline clearing out unusable instructions.

DESCRIPTION OF THE INVENTION

Overview

Figure 1:
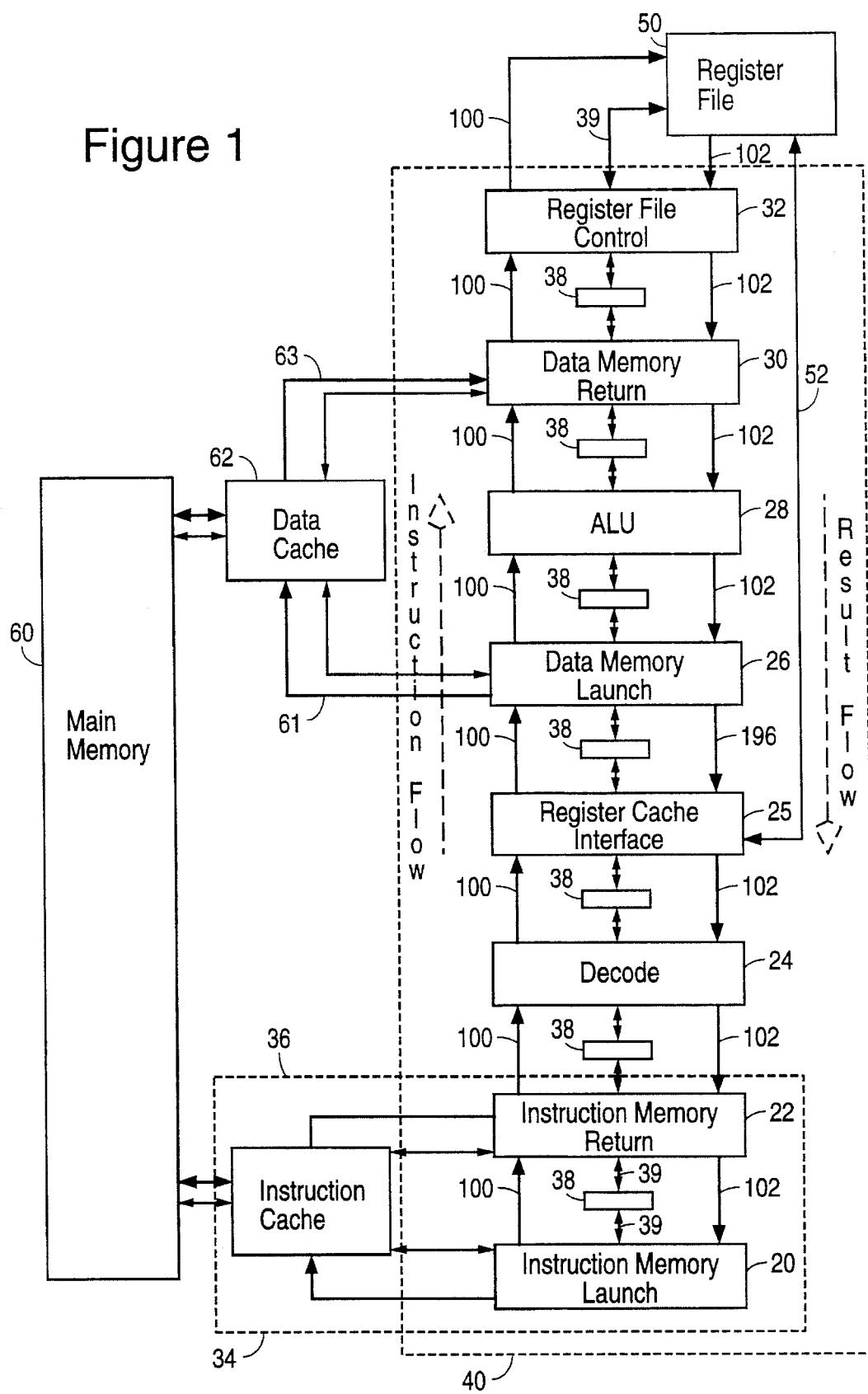
FIG. 1 is a block diagram of a typical pipeline processor built according to the present invention, including instruction fetch equipment and register file.

The present invention uses a new pipeline structure, called the "Counterflow Pipeline" to make a general purpose computer. There are three principal features of the counterflow pipeline structure that make it useful for building computers. First, the counterflow pipeline structure consists of a series of very similar stages connected together in linear fashion. These stages are described conceptually as arranged one above the other, though of course their actual position in an electronic device is immaterial to their operation. A simple linear arrangement of similar stages makes a counterflow pipeline easy to design. Second, each stage in the counterflow pipeline is able to communicate in both directions with its adjacent neighbors. We speak of these communications conceptually as going "up" and "down", though of course the actual directions are established by the communication paths in a physical embodiment of the device. The communication in both directions permits instructions to flow through the pipeline in one direction and answers from previous instructions to flow through the pipeline in the other direction. Third, the counterflow pipeline is able to ensure that each value flowing in one direction will meet and may interact with each and every value flowing in the other direction once and exactly once, a property called "countersynchronized comparison". The countersynchronized comparison property of the counterflow pipeline ensures that each instruction meets the results of all previous instructions and may copy data from them if needed.

Results from earlier instructions will flow down through the pipeline so as to be accessible to later instructions. The fact that each stage communicates only with its nearest neighbors limits the lengths of wires required to connect the stages, thereby minimizing long bypass paths. Local communication also simplifies the design of each stage because all stages are identical in form and each communicates with its two neighbors.

Instructions Flow Up in Order

It is convenient to think of instructions as flowing up through the pipeline. The end of the pipeline designated as bottom is connected to the memory containing the instructions via the mechanism that fetches the instructions from memory. Instructions enter the pipeline at its bottom end and flow upward through the pipeline. While flowing through the pipeline, instructions stay strictly in sequence; later instructions may not pass, i.e., change relative position with, earlier ones. Because we think of instructions in the pipeline as flowing up, later instructions lie below earlier ones; a snapshot of the instructions in the pipeline at any one time looks like a programmer's listing of the instructions.

Instruction Package Content

Each instruction flowing up in the pipeline carries with it a collection of data useful to processing operations. Such an "instruction package" contains:

1. An operation code that tells what the instruction is supposed to do. There may be separate operation codes for the various operations such as ADD, SUBTRACT, SHIFT, LOAD FROM MEMORY, and so forth. The operation code may be just a transcription of the information stored in memory about the instruction, or it may be a translated form of the information. Later stages in the pipeline will examine the operation code to decide what work to do on this instruction. For example, a stage capable only of adding will act only on those instructions that require addition operations and will pass instructions that require other operations.

2. When the instruction is taken from memory, it identifies some source registers whose values will serve as input to the operation to be performed. These source registers are each identified by a unique combination of bits called the "address" or the "name" of the register.

The address or name identifiers of the source registers travel as a part of the instruction package. The proper value for each source register to be used in doing the instruction, when it becomes known, is also made a part of the instruction package. We will shortly see how these source values get into the instruction package. In addition to the address and value, the instruction package contains some marker bits to indicate validity of each register value. These marker bits indicate if the value has yet been found or remains still unknown.

3. The address or name identifiers of destination registers of the instruction also travel in the instruction package. When an instruction is executed, its destination values become known and form a part of the instruction package. The destination register or registers identified by the instruction will be the ultimate repository of the value or values computed by the instruction. In addition to the address and value for each destination register, there are also some marker bits to indicate whether each destination register value has been computed or remains unknown.

Instruction Execution

Different stages of the pipeline are able to execute different instructions. Of course the pipeline must have at least one stage able to execute each instruction type that is to be processed, but it might have more than one stage able to do some operations. When an instruction package reaches a stage that can execute its instruction and is free to do so, the stage will execute the instruction if the instruction package contains a value for each of the source values required by the instruction. If the source values are not all available, the instruction package may progress up the pipeline, provided that a later stage is also able to execute the instruction. If the instruction has not been executed when its package reaches the last stage that can execute it, the instruction package will wait until all its source values have been filled in so that it can be executed.

When an instruction is executed, the computed values that it produces are put in two places. First, they go into the destination register part of the instruction package itself. As a part of the instruction package they travel up the pipeline and, as we shall shortly describe, may eventually be recorded in a register file.

Second, a copy of the computed values is placed into the results stream. These "answer values" may be copied into a result package, or a new result package may be created to hold them. In either case, they then flow down the pipeline. The copy of the computed values that flows down the pipeline will interact with later instructions as it meets them. This downward flow of answer values within results packages provides the mechanism by which later instructions obtain the source values they need.

Results Package Content

The answer values flow down the pipeline in "result packages". Each such package contains information about one or more previously computed values. For each such answer value, the result package contains:

1. The address or name of the destination register into which this value will ultimately be put. Of course, it is the copy of this destination information carried by the instruction package rather than the one in the result package that will actually reach the register file. The copy in the results package is there to inform subsequent instructions about the values computed by their predecessors.

2. The computed value. This answer value will contain all of the information computed. Some operations compute only very little information, for example, a condition code. Other operations compute a byte or character value. Many operations compute a full computer "word" which might be 32 or 64 bits or more.

3. Some extra bits that tell whether this register value is meaningful. Under certain circumstances, yet to be described, it may be necessary to invalidate some parts of a result package. These marker bits are used for that purpose.

Answers Flow Down in Partial Order

The results flowing in the result stream preferably retain a partial ordering. Any two results that have the same register address should remain in order. Results that have different register addresses may assume any order. In some designs it may be desirable to provide special paths through which some important results may move more quickly than others. Such paths may disrupt the sequence of results. Proper operation may depend on maintaining the sequence of particular results only if they bear the same destination register name or address.

The order of instructions in a pipeline built according to the present invention will in general match the order in which they were issued at the bottom of the pipeline. The result values in the results pipeline flowing down, however, are only partially ordered. Values carrying the same register name or address remain in relative order, but values differing in register name or address may assume any order.

Instructions can be strictly ordered going up the pipeline and results for the same destination address can also be strictly ordered. If applied, these two rules ensure that each instruction meets and can take its source values from results produced only by instructions ahead of it in sequence. As we shall shortly describe, another mechanism ensures that each instruction meets only proper result values for any registers whose value it requires as source information.

All Instructions Compared With all Passing Results

A very useful feature of the counterflow pipeline used by the present invention is "countersynchronized comparison". Because of the countersynchronized comparison property of the counterflow pipeline, each and every instruction package passing up the pipeline can be compared against each and every result package that it meets flowing down. As described in the copending Counterflow Pipeline application, pipeline communication is so arranged that if an instruction passes from an earlier stage, E, to a later stage, L, and if concurrently a result passes from stage L to stage E, the instruction and the result must meet exactly once in some stage between L and E inclusive. This countersynchronized comparison feature is accomplished by special circuits built into the counterflow pipeline and described in the above-identified application.

The countersynchronized comparison feature of the counterflow pipeline permits useful interactions between instructions and results as follows:

When an instruction and a result meet in any stage of the pipeline, that stage compares the source addresses in the instruction package against the register addresses in the result package. Any match indicates that the result is carrying data that the instruction needs as a source value. In response to a match in this comparison, therefore, the stage will copy the answer value from the result package into the instruction package. By this process the instruction package is able to "garner" the values it needs from the result stream.

When an instruction and a result meet in any stage of the pipeline, that stage compares all of the destination addresses in the instruction package against all of the destination addresses in the result package. Any match indicates that the instruction has or will recompute an answer value carried by the result package. The answer value, therefore, represents a previous value of this register that has or will be recomputed by the present instruction. The previous value carded by the result is therefore obsolete. Thus when a stage finds a match between a destination address and a result address, the stage "kills" the result either by deleting the result package from the result stream, or by marking it or its answer value as obsolete. In either case the result is prevented from further interaction with instructions.

Killing results is a very useful attribute that facilitates proper operation of the Counterflow Pipeline Processor. A result is killed if it meets an instruction that has or will recompute its value. Killing results causes a particular result value to exist in only a very limited part of the results stream. The result value is generated by the instruction that initially computes its value. It can then meet subsequent instructions only up to and including the first subsequent instruction that has or will recompute its value. The result value can be used as a source value only for instructions between the one that computed it and the next one that has or will recompute it. A previously computed result cannot be used as a source value by an instruction that follows one that has or will recompute that result value. Those later instructions, however, will receive a fresh version as already computed or yet to be computed by the instruction that killed the first version of the result. Thus every instruction receives only the latest values of each register that it might use as source information.

Killing Provides Mechanism for Register Renaming

This very simple and regular mechanism permits several different values designated with the same name or register address to coexist in the results stream. It ensures that each such value reaches only the instructions that properly should use its value. It prevents such values from interacting improperly with instructions outside the region where that value should be valid. Comparing result names or addresses to destination names or addresses in instructions provides the effect of register renaming in a very simple and regular structure.

Register File at the End

The Counterflow Pipeline Processor, like other processors in use today, may contain a register file to retain computed values. Such register files are built with high speed circuits so that data may be put into and taken out of them quickly. They also operate quickly because they contain only a few dozen registers in all. In the pipelines used in conventional microprocessors these registers are located near the beginning of the pipeline so that values from the registers can be made available to each instruction as soon as possible. In contrast, the register file in the Counterflow Pipeline Processor may be located at or near the terminal end, or top of the pipeline.

Values Recorded Only After Instructions Complete

By placing the register file at the top end of the pipeline, where instructions arrive only after being fully processed, only properly computed values are recorded in the register file. Instructions not only carry computed values up to the register file but also insert them as results into the result stream, and the result stream interacts with subsequent instructions, providing them with the source values they need. Thus, the Counterflow Pipeline Processor may access values from its register file less frequently than does a conventional computer.

The register file at the top end of the pipeline can best be thought of as a summary of the results of older instructions that have passed by it, depositing their answers into it.

Getting Results From the Register File

In a Counterflow Pipeline Processor with a practical number of stages, a register file may be necessary. Many instructions, and in a well designed system, most instructions will garner their source values from the results stream without reference to the register file. Some instructions, however, use source values that were computed long ago. The results required by such instructions may have passed completely through and out of the results stream long before the instruction that needs the result enters the pipeline. Such instructions cannot garner the values they need from the values remaining in the result stream. In order to provide source values to such instructions the register file must send their recorded values down the result stream.

The Counterflow Pipeline Processor will operate correctly if the register file uses any of a wide variety of reissue schemes. Some schemes may cause the register file to reissue values that have been rendered obsolete by instructions in the pipeline that have not yet reached the register file. This causes no problem, because results reissued by the register file, like other results, will be killed if they reach an instruction that has or will recompute their value. Thus schemes for reissue of register values from the register file need not be concerned with obsolescence of the values in the file.

One reissue scheme is to reissue the value of each register periodically. Eventually all register values will be reissued, and so the needs of any instruction waiting for values will eventually be satisfied.

Another scheme is to reissue all values that might be required by each instruction entering the pipeline. This scheme requires sending the source register addresses of each instruction to the register file as soon as the instruction is decoded. A communication path for this purpose is included in the preferred embodiment of the present invention.

Another scheme for reissue involves keeping a record early in the pipeline as to which register values are currently being recomputed in the pipeline. As each instruction is decoded, its destination registers are noted and a record is kept of their identity. The values of these registers will eventually return down the results path. Until the values return, the values are available within the pipeline to any subsequent instruction that needs them. By this mechanism a processor can request reissue of register values only of registers that are required by instructions and known not to be available within the pipeline already. This is the mechanism of the preferred embodiment.

Special Registers

Nearly every instruction set definition has some special registers that can be accessed selectively by certain instructions, e.g., Condition Codes (CC) and the Program Status Word (PSW). In the Counterflow Pipeline Processor these registers can be treated just like the general purpose registers. Instructions that use data from them can be treated as if they use the special register as a source register. Instructions that change the special registers are treated as if the special register were a destination. These special registers are stored in the register file along with other registers in the machine and, like other registers, are accessed as needed.

Condition Codes

One common special register is called the condition codes. These commonly record whether the last operation generated a Zero (Z), Negative value(N), produced Overflow (O), or generated a Carry out (C). In many instruction sets, including the SPARC instruction set, the ZNOC bits can be treated as a four bit register. By this reckoning, any arithmetic operation that sets the condition codes has an extra destination, namely the condition codes. Any operation that tests the condition codes has an extra source value, namely the condition codes. This treatment of the condition codes permits their values to flow in the results pipeline just like other computed answer values. At any one time there may be several different values of the condition codes present in the results pipeline, corresponding to the output of several different instructions that computed values for them.

Program Status Word

Another common special register is the program status word, PSW. This register is used by and set by only certain specialized instructions. Nevertheless, it can be treated just like other registers. The program status word commonly contains information about the operation mode of the machine. For example, is the machine responsive to interrupt at this time? Is it able to perform privileged instructions, and so forth.

It is perfectly acceptable in a Counterflow Pipeline Processor to have several copies of the program status word situated along the pipeline. These copies will be changed whenever a PSW result package reaches them, thus keeping them up to date in a timely fashion. They will be rendered obsolete whenever any instruction passes them that might reissue a new value.

Traps and Exceptions

Another important advantage to placing the register file at the end of the pipeline rather than at the beginning exists in handling traps and other exceptions in the regular flow of instructions. Traps or interrupts occur when an unusual condition happens in some part of the computer. For example, an attempt to divide by zero, which would result in a meaningless answer, causes a trap in most computers. Similarly, making reference to an inappropriate memory address will also cause a trap or interrupt. The program expects that instructions prior to the trap or interrupt will be completed before the interrupt is acted upon and instructions subsequent to it will wait until after the interrupt has been serviced.

Pipeline processors of all kinds must handle traps and interrupts as if the pipeline did not exist and each instruction was completed before starting the next. The programming model described for the instruction set of the family of computers contemplates execution of instructions one at a time, even though in many pipelines, including the one described here, several instructions may be executed at once or instructions may even be executed out of order. Designing a computer to behave as if the instructions prior to the trap or interrupt had all been finished and those afterwards not finished can be a very difficult task when instructions are executed concurrently or out of order.

By putting the register file at the end of the pipeline, the present invention greatly simplifies the operations required to handle a trap or interrupt. Only instructions that have been processed completely and successfully ever reach the register file and record results in it. All instructions that have not yet reached the register file may be abandoned at any time and restarted after a trap or interrupt has been handled.

In the Counterflow Pipeline Processor, if a particular instruction causes a trap, the stage that discovers such a difficulty inserts a special kind of "trap" result into the results stream. The trap result announces the occurrence of the trap to all subsequent instructions as it meets them in the pipeline. Wherever it meets an instruction, that instruction is either marked as invalid or deleted from the pipeline. Whether through marking or deletion, such instructions are prevented from changing the contents of the register file, and thus have no effect on the permanent record of the successful actions of the computer.

The same trap result carries with it information about which instruction created the fault and the type of fault. Eventually the trap result will reach the instruction fetch mechanism at the bottom of the pipeline, having cleared out the entire pipeline of any instructions following the one that caused the fault. The instruction fetch mechanism can now begin to fetch instructions from the trap handler. After the trap handler is finished, the instruction fetch mechanism can resume fetching instructions starting with the one that created the fault because the trap result identified the point where the program can resume.

Detailed Description of the Invention

Vertical Arrangement of Stages

The basic structure for a general purpose computer according to the present invention consists of a plurality of stages 20–32 forming a counterflow pipeline 40 as shown in FIG. 1. Each stage communicates bi-directionally with the stages above and below it in the pipeline. FIG. 1 is drawn with successive stages above each other so that information flows up and down through the stages. Of course it must be recognized that in a real machine information may flow in whatever direction is set by the geometry of the physical communication paths. In this description the vertical arrangement of FIG. 1 and the use of flow directions "up" and "down" is merely for descriptive convenience.

Instructions Flow Up, Results Down

As illustrated by the labeled direction arrows in FIG. 1, information related to instructions flows upward in the pipeline, and information related to computed results of completed instructions flows down. Although in an actual machine the direction of flow is immaterial, it is easiest to understand the operation of the pipeline if instructions are thought of as flowing up because a snapshot of the instructions in the pipeline at any moment resembles a listing of the instructions as commonly used by programmers. In both the snapshot and the listing, later instructions appear below earlier ones. The instructions enter at the bottom of the pipeline, flow upward through the pipeline, and when fully processed exit at the top.

Instruction Fetch at Bottom

In the pipeline processor illustrated in FIG. 1, an instruction fetch mechanism 34 at the bottom of the pipeline serves to deliver instructions into the bottom of the pipeline. The instruction fetch mechanism consists of an instruction memory launch stage 20, an instruction cache memory 36 and an instruction memory return stage 22. The program counter, not specifically illustrated, is a part of the instruction memory launch stage 20.

Many forms of instruction fetch mechanisms are in use in computers today. The form chosen for illustration in FIG. 1 is only one of a variety of mechanisms that might be used. Its function is to introduce instructions into the pipeline at stage 22.

Register File at Top

When instructions reach the register file control stage 32 at the top of the pipeline the values they have computed or retrieved from memory are recorded into the register file 50 shown at the top of the pipeline. Only instructions that are completely executed will exit at the top of the pipeline. The register file 50 stores the values, and can reintroduce them into the results side of the pipeline on demand.

A communication path 52 is shown between the decode stage 24 and the register file 50. When used, signals on this path identify, by name or address, registers in the register file whose values should be reintroduced into the downward flowing result stream.

Memory and Data Cache

Also illustrated in FIG. 1 are a Main Memory 60 and a Data Cache 62. The operation of these will be described in greater detail later. In FIG. 1 the data cache is shown connected to the data memory launch stage 26 and the data memory return stage 30. The main memory is shown connected to the Instruction Cache 36 and the Data Cache 62. Many arrangements of these components are possible, as will be evident to those skilled in the art.

The connection of data cache and main memory illustrated in FIG. 1 operates as follows. When an instruction that needs information from memory reaches the data memory launch stage 26, its needs are signaled to the Data Cache 62 via path 61. Meanwhile, the instruction is free to move on up the pipeline to stage 30, where it awaits an answer. When the answer has been found, the data cache delivers the required information to the data memory return stage 30 via path 63 where it rejoins the instruction that requested it. If the data are not available in the data cache, the data cache will seek the information in main memory. Should the information be unavailable there, a trap return will be given to the instruction waiting in stage 30, whereupon the trap behavior of the machine will be invoked as will be described later.

Notice that because the pipeline is able to store a partly processed instruction in each stage, the configuration of the data cache 62, the main memory 60, and the pipeline stages 26 and 30 in FIG. 1 permits there to be three outstanding memory references at any one time. When three memory references are outstanding, the three instructions involved will be located in stages 26 28 and 30. No more instructions can have access to the data cache until it has returned an answer to the instruction in stage 30. In connection with FIG. 9 we will later describe alternative configurations of memory parts that permit additional outstanding memory instructions.

Communication in the Pipeline

Communication paths 100 and 102 are illustrated between each pair of stages in FIG. 1. Communication path 100 is used to pass instructions up the pipeline and communication path 102 is used to pass results down. These communication means are controlled by a communication control device 38 located between each pair of stages. The communication follows the rules described in the co-pending application, Counterflow Pipeline, previously mentioned. The control devices 38 between each pair of stages provide for orderly progression of information up and down, ensuring that conflicting demands are met in a was as to provide for "countersynchronized comparison" as described in the Counterflow Pipeline application.

Single Stage Register Structure

Figure 2:
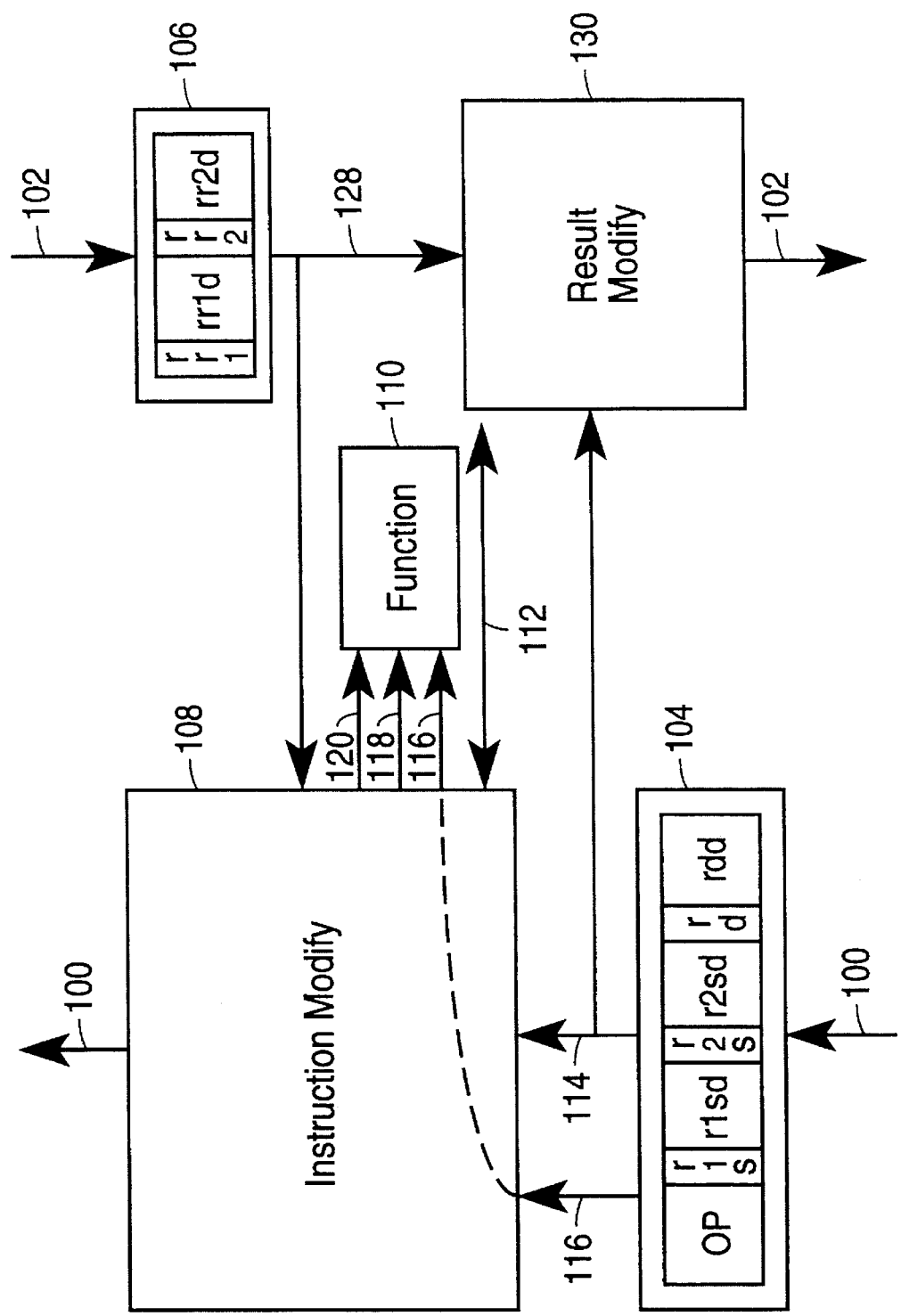
FIG. 2 is a block diagram of a single stage of a processor built according to the present invention showing communication paths to adjacent stages.

In a pipeline built according to the present invention, the stages are quite similar to each other in basic configuration. A typical configuration is illustrated in FIG. 2, which is a more detailed view of a typical pipeline stage such as 28. Recall that the stages communicate primarily with adjacent stages, in both directions, along the communication paths 100 and 102 seen already in FIG. 1 and shown in part in FIG. 2.

Instructions flowing up from below through communication path 100 are captured in a register device 104. The structure of a typical instruction is illustrated inside the device 104 consisting of an operation code, OP, and three similar register parts, two for sources and one for a destination register. It must be remembered that any number of source and destination registers could be accommodated, but for illustrative purposes we show only three. The three register parts illustrated are: rd=the destination register name or address and additional validity bits; rdd=the destination register value, if known; r1s=the first source register name or address and additional validity bits; r1sd=the first source register value, if known; r2s=the second source register name or address and additional validity bits; r2sd=the second source register value, if known.

Similarly, result packages flowing down from above through communication path 102 are captured in register device 106. The structure of a typical result package is illustrated inside the box representing the register device. As illustrated, the result package contains two result values. It must be remembered that any number of result values might be used in a result package; two are used for illustrative purposes only. The result package illustrated contains: rr1= the first result register name or address, if known, and additional validity bit; rr1d=the first result register value, if known; rr2=the second result register name or address, if known, and additional validity bits; rr2d=the second result register value, if known.

Each Stage Executes Some Part of the Instruction Set

In addition, FIG. 2 illustrates an instruction modify device 108, a function computation box 110, a result modify device 130, and communication paths between them 112, 114, 116 and 128. Not illustrated are the control paths that indicate when the various operations are to take place.

In the pipeline of the present invention different stages of the pipeline are capable of executing different parts of the entire set of instructions available to the machine. As shown in FIG. 2, circuitry capable of computing suitable values is included in selected stages. Some stages may do no computing at all. In some embodiments a single stage might do all of the computing, but usually different kinds of computing operations will be done in different stages. Of course, some stage must be capable of executing each type of instruction that is to be used, but no one stage need execute them all. Moreover, there may be a plurality of stages capable of executing any one type of instruction. For example, it may prove useful for several stages to be capable of addition. The details of these differences between stages are largely confined to the particular details of the function box 110 which may be vastly different from one stage to another. The registers 104 and 106, and the modify boxes 108 and 130 are very similar from one stage to another.

Result Package Modification

Figure 3:
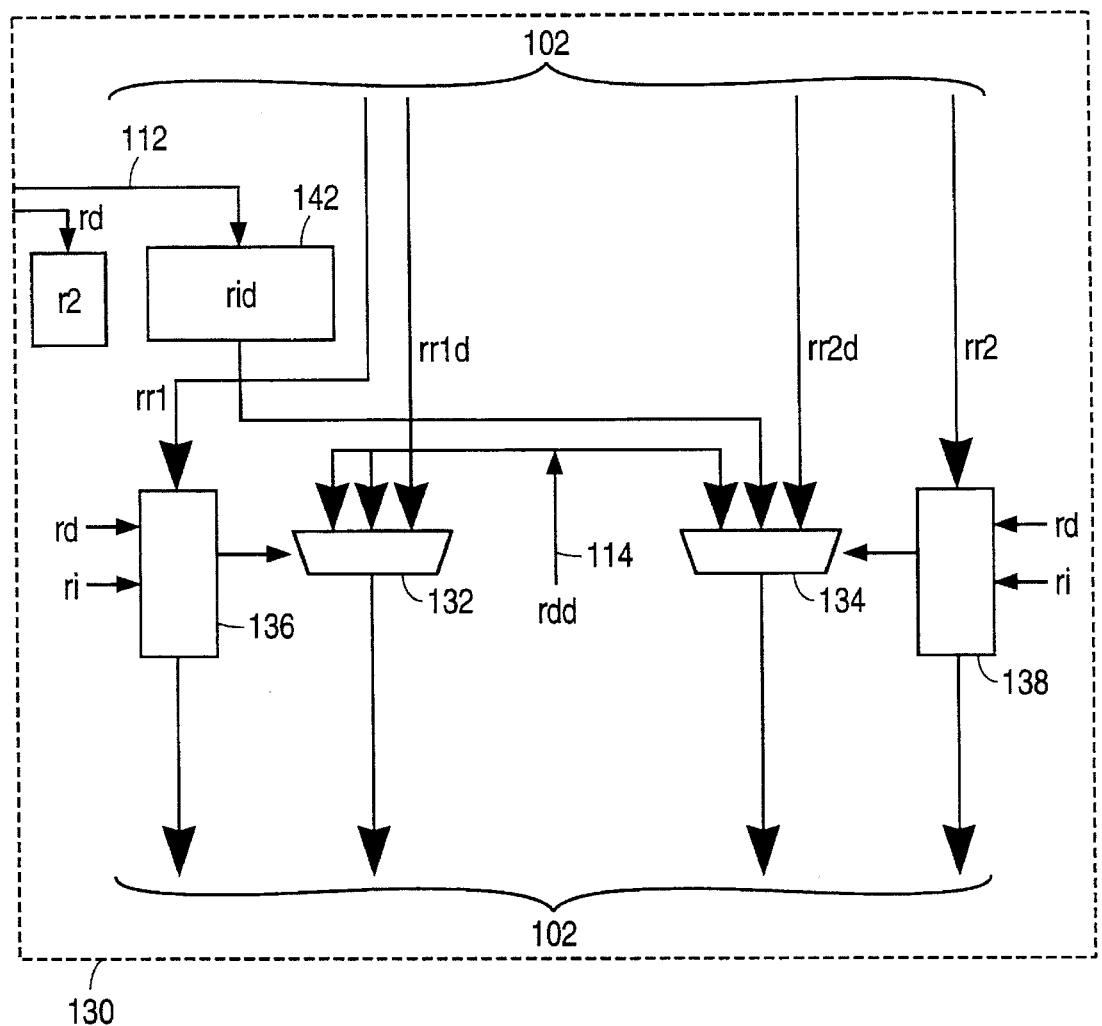
FIG. 3 is a block diagram of the result modification circuits for a single stage of a processor built according to the present invention.

FIG. 3 illustrates the content of the Result Modify box 130. Information indicative of the existing value of the register 106 of FIG. 2 enters the device from the top on communication path 128, shown broken into its constituent pans. The purpose of the Result modify box 130 of FIG. 3 is to replace some or all of that information with information from the instruction, as required.

Two multiplexors, 132 and 134 select one of their three inputs for delivery to the stage below on the output path 102 shown broken into constituent pans. Thus the output result values for the next stage delivered down communication path 102 may come either from the inputs held in this stage, called rr1d and rr2d, from a previously held destination value, called rid and delivered on communication path 114, or from a value computed in this stage, called rid and delivered on communication path 112 from the function box 110 of FIG. 2 and held in register means 142.

Two address or name comparison units, 136 and 138, compare the addresses or names of the existing results, rr1 and rr2, against those of the instruction, rd and ri. The results of these comparisons control the multiplexors 132 and 134 respectively, as shown. Moreover, the comparison boxes 136 and 138 deliver name or address information to the output communication path 102 consistent with the choices they select for the multiplexors.

Instruction Package Modification

Figure 4:
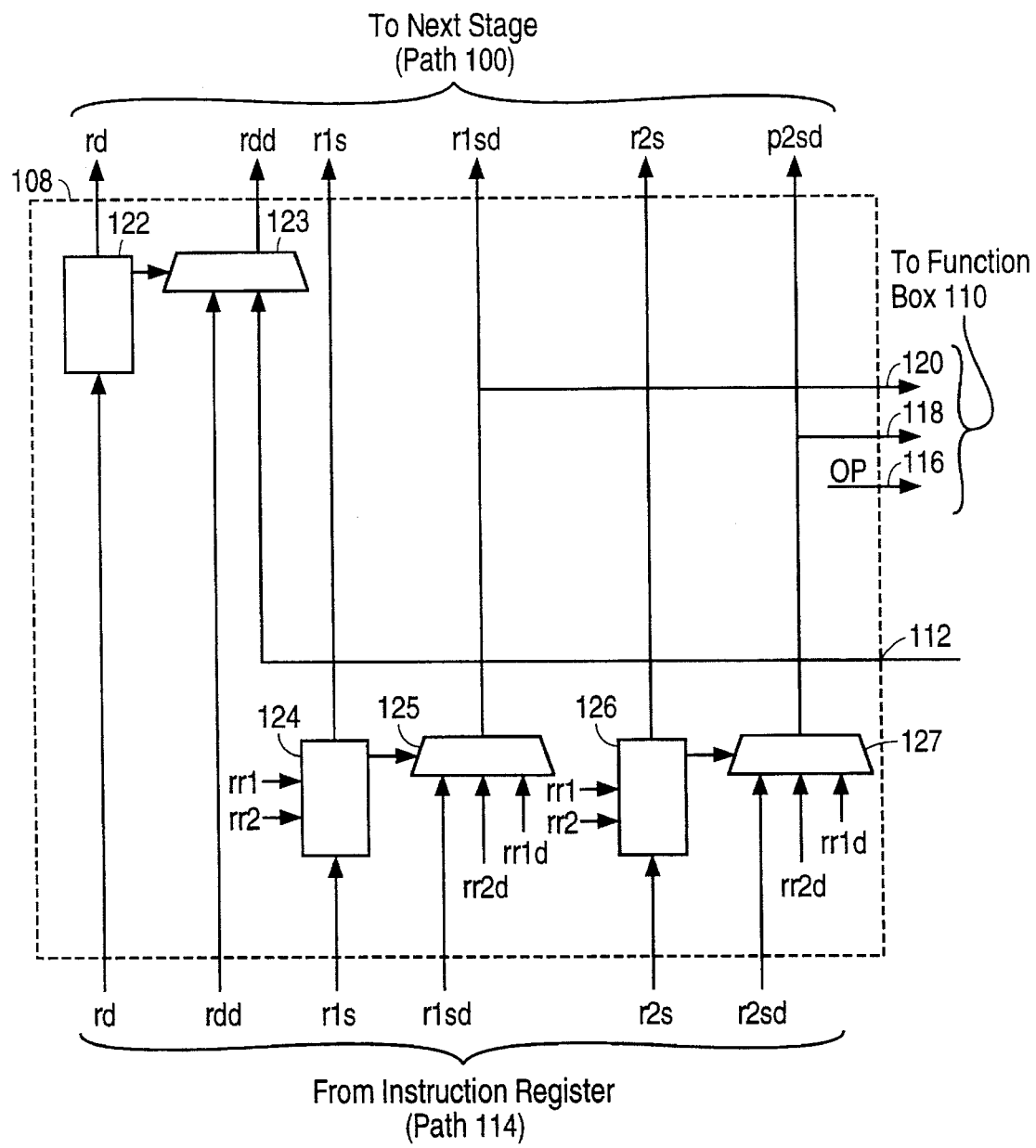
FIG. 4 is a block diagram of the instruction modification circuits for a single stage of a processor built according to the present invention.

FIG. 4 illustrates the content of the Instruction modify box 108 shown in FIG. 2. The data path 114 from the register 104 is illustrated at the bottom of FIG. 4 broken into its constituent pans. The output communication path 100 is illustrated at the top of FIG. 4 also broken into its constituent pans. The communication paths 116 118 and 120 to the Function box 110 are illustrated at the right of FIG. 4.

A multiplexor 123 and an associated control device 122 serve to make the destination output rdd at the top of the figure indicative of either the information entering at the bottom of the figure, as it was delivered from the previous stage, or substituting destination information from the function box via communication path 112. In either case the destination address rd is copied through the control device 122, possibly modifying the validity bits.

A control device 124 compares the source register name or address, r1s, of the current instruction with the register names or addresses of the result package, rr1 and rr2. In the event of a match, the multiplexor 125 substitutes the correct new information from the result package, rr2d or rr1d. In the event of no match, the former value r1sd is passed upwards. The control device 126 and multiplexor 127 serve an identical function for the second source value.

Register to Register Instructions

In order to understand the present invention, one must understand the common form of instructions used in modern computers. It is common for modern computers to include a file of a few dozen registers whose contents are used in executing most instructions. Each instruction specifies an operation to be performed and identifies one or more of the registers from the register file on which the instruction is to be performed. Some of the designated registers will hold source data for the instruction and some of the designated registers will be destinations for the values computed as a result of the operation. For example, an instruction in one format identified in the SPARC Architecture Manual refers to two source registers to provide the two numbers whose sum is desired, and a single destination register in which to put the result of the addition.

The instruction set for a modern computer family, for example the SPARC instruction set, includes a number of such operations to perform different arithmetic and logical operations on the contents of the designated registers. For example, fixed point addition, multiplication, division, logical shifting, and masking operations are included. Many machines also include floating point arithmetic operations that refer to a separate set of registers in a similar way.

In nearly all modern machines, instructions that reference main memory do so also with regard to the values stored in the register file. For example, an instruction called LOAD in the SPARC instruction set uses the contents of one register as the address in main memory from which to fetch information and places the information thus fetched into another register. Thus the form of a memory operation is the same as that of an arithmetic operation in that it accesses both source and destination registers; only the mechanism used to find the new data differs. In the case of an arithmetic operation computing circuits find the new value; in the case of a memory operation the new value is found by lookup in a large memory.

Each instruction designates the registers that will be used or affected by that instruction. The designations are binary codes that uniquely describe a particular register from the register set. In the SPARC instruction set, for example, the binary code designating each register is 5 bits in length.

For purposes of the present invention it is immaterial how the register designations are encoded. We will refer here to the "name" of a register, or the "address" of a register meaning its particular designation however encoded. It is important to recall that the name or address of a register is merely a designation that distinguishes it from other similar registers.

Condition Codes as Registers

Most modern machines report a few simple facts about the numbers they handle by means of a few bits called condition codes. Four condition codes are commonly used to indicate 1) whether the result is zero (Z), 2) whether the result is negative (N), 3) whether the arithmetic or logical operation just performed produced an overflow (O) and 4) whether the arithmetic operation just performed produced a carry (C).

In a pipeline processor built according to the present invention, such condition codes may be conveniently treated as a register. Instructions that generate a condition code am treated as if the condition register were an additional destination register. Instructions that use a condition code as input treat it as a source register value. The condition codes themselves are given a name or address similar to those of the other registers. The register address comparison circuits treat condition codes as just another register value. This view of condition codes as simply another register in the register set of the computer is unusual. Because condition codes in most machines are thought to hold special importance they are often treated separately from other registers. Thus the SPARC instruction set is commonly thought of as a "three address" instruction set in which instructions combine the contents of two source registers and put an answer in a single destination register. In truth, however, the SPARC instruction set is a "five address" instruction set because some instructions combine two source registers and the old condition code values to produce both a new arithmetic answer and a new set of condition codes. In the present invention the condition values are treated just the same as the other register values, providing a valuable simplification in structure.

Minimum Rules

Countersynchronized Comparison

A very useful feature of the present invention is that each stage has circuitry to compare register names in upward flowing instruction packages with register names in downward flowing result packages. In the event of a match of register names, the stage may copy information from downward flowing data to upward, or delete or mark for deletion, data flowing in one direction or the other. As a result, in the present invention simple local operations carried out separately in each of several stages of a pipeline can implement properly the complex behavior required of a modern computer. Such a simple local mechanism can function predictably because the counterflow pipeline control system provides for "countersynchronized comparison". Countersynchronized comparison ensures that every upward flowing instruction can be forced to meet and interact with every downward flowing result.

Data Path Circuitry

Figure 5:
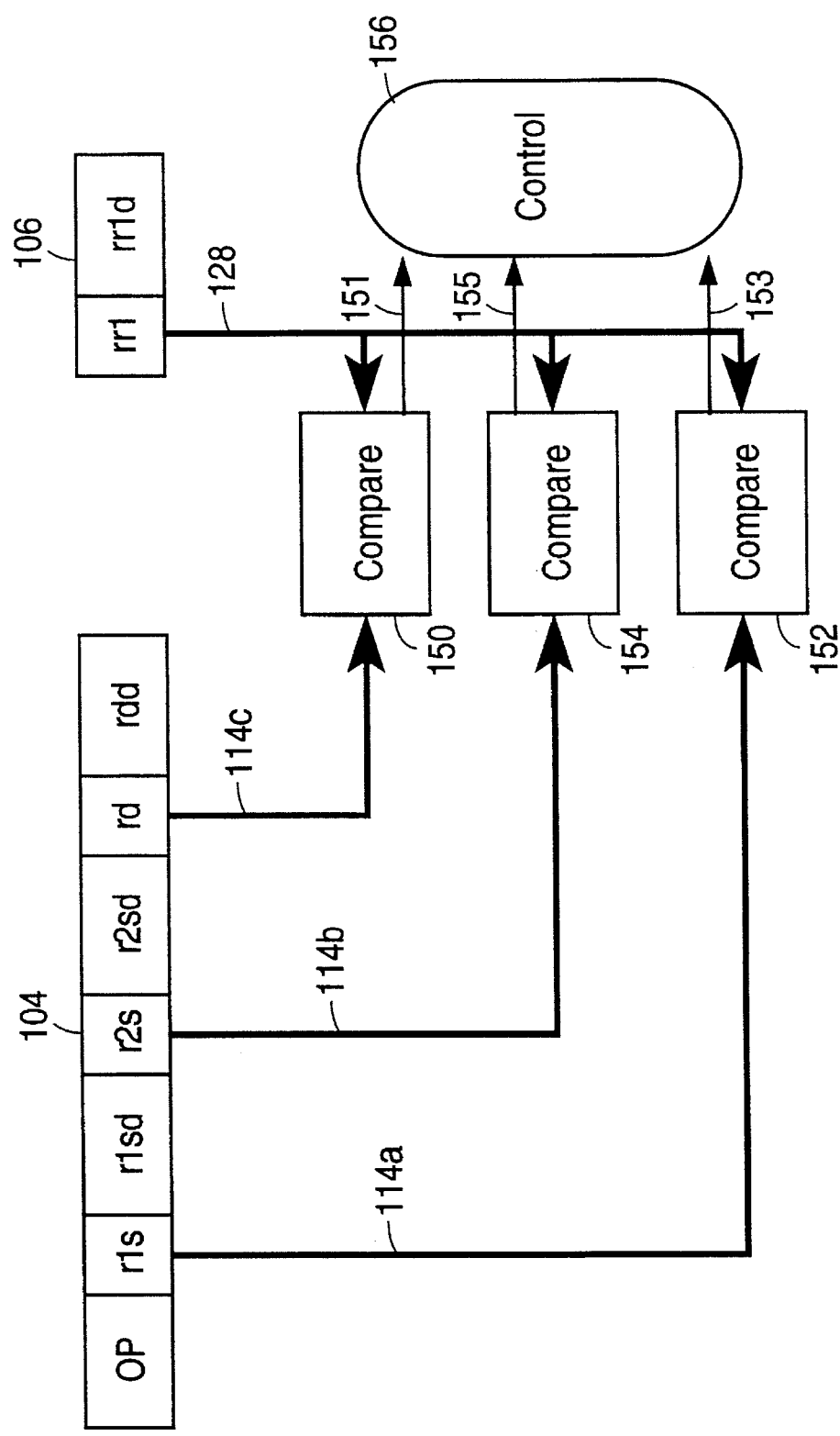
FIG. 5 is a block diagram of the instruction and data latches and the address comparison circuits in a single stage of a typical embodiment of the present invention showing how instructions and results are compared.

The control mechanism described in the companion application ensures that countersynchronized comparison is possible. Address or name comparison circuits to do the comparisons typical for a general purpose computer are illustrated in FIG. 5. Each stage of the pipeline preferably contains both the suitable control described elsewhere and this minimum comparison equipment so that each and every instruction may properly be processed.

The comparison circuitry consists of a number of compare circuits (150, 152 and 154 are illustrated) that compare the source and destination. These are connected between the instruction holding register 104 and the result holding register 106 as has been already described in part in connection with FIGS. 2, 3 and 4. Here in FIG. 5 we see an extract of the comparison circuitry only to more clearly reveal its function.

Each of the address or name parts in the instruction package 104 must be compared with each of the address or name parts in the result package 106. In FIG. 5, a result package with but a single result register is illustrated, in contrast to the dual result package illustrated in FIG. 2. The results of these comparisons 151, 153 and 155 are delivered to control circuitry 156 that control the flow of data through the system. We have already seen examples of this in FIG. 3: comparison device 150 is a part of the comparison and control device 136 shown in FIG. 3. Similarly, comparison device 152 is a part of the comparison and control device 124 in FIG. 4. In like manner comparison device 154 is a part of the comparison and control device 126 in FIG. 4.

In operation, the comparison circuits may reveal several cases which are acted upon by the control circuitry 156.

No Match

The comparison may show no match between the register name of the result and the source and destination register names carried by the instruction. In this case the result is free to pass down to be compared with later instructions.

Source Match

The comparison may show a match between the register name of the result and one or more of the source operand register names carried by the instruction. In this case the stage should copy the data carried by the result into the places reserved in the instruction for source operand values. This is done by the multiplexors 125 and 127 of FIG. 4. This process is called "garnering". We say that the instruction "garners" the values that it needs from the result stream.

Destination Match

The comparison may reveal a match between a register name in the result package and a destination register name carried in the instruction package. In this case the instruction either has or will compute a fresh value for the designated register. Instructions subsequent to this instruction must meet only the new value. Therefore, the old value must be removed from the result stream or marked as invalid, and in either case will not influence subsequent instructions.

Note that in the case of destination match, if the instruction with such a match has already completed execution, then the newer value computed for the matched register is already passing down through the results pipeline. The new result is thereby already delivering the new value to subsequent instructions. If the instruction with such a match has not yet executed, it will somewhat later on deliver its output value to the result stream and thus to instructions that follow it in sequence. In either case the result so matched that came from a previous instruction is rendered obsolete by the presence of an instruction that has or will compute a value for the same destination register.

Stalls

In a computer built according to the present invention, instructions garner source data as they pass through the stages of the pipeline. They gather this source data from the results flowing in the opposite direction past them. Eventually each instruction reaches a stage of the pipeline that is capable of executing it. If the instruction has already garnered all of the source data required, then it can execute immediately. Some or all of the required source data may be missing, however.

If some or all of the required source data is missing one of two things will happen. If a subsequent stage of the pipeline is capable of computing the required value, the instruction may pass on up through the pipeline to be executed at that further stage. However, if an instruction arrives at the last stage in the pipeline capable of executing it and is still missing some or all of its source data, it must wait there until the source data arrives via the results pipe. Such a delay is called a "stall".

Such a stall is similar to the stall events in other processors, except that in the present invention it can be a purely local event. There is no need to stall the entire pipeline merely because one stage somewhere in the pipe has stalled. If there is sufficient empty space in the pipeline for other stages to perform their function or to pass data forward or results back, they remain free to do so. Nothing in the design of the pipeline of the present invention requires a general global stall. This is a considerable advantage because the circuits that recognize and act on stall conditions in conventional pipelines are often the limiting factor in the speed of such systems.

It is well known in the art how to design pipeline processors that are elastic, i.e., that have blank spaces in them capable of absorbing or delivering extra data on demand. By including such buffers in the pipeline of the present invention, parts not affected by a stall may continue to operate even if some local stall has occurred. Of course, a stall anywhere in the pipeline, if it persists long enough, will eventually bring the entire pipeline to a halt, but such events are rare.

Register File and Register Caches

A simple form of the pipeline processor disclosed here stores results from past instructions only in its register file at the top of the pipeline. Instructions that need source values garner them from the result stream. Such results may have to enter the result stream from the register file if they are not otherwise available. Because most instructions need two source values, this may produce a great demand for values from the register file.

Statistical analysis of programs show that a subset of the registers is used much more frequently than the rest. By remembering the values of these frequently-used registers early in the pipeline, a more sophisticated design can reduce the demand for information from the register file. We call such a mechanism a "register cache". A pipeline with such a register cache is illustrated in FIG. 6.

Figure 6:
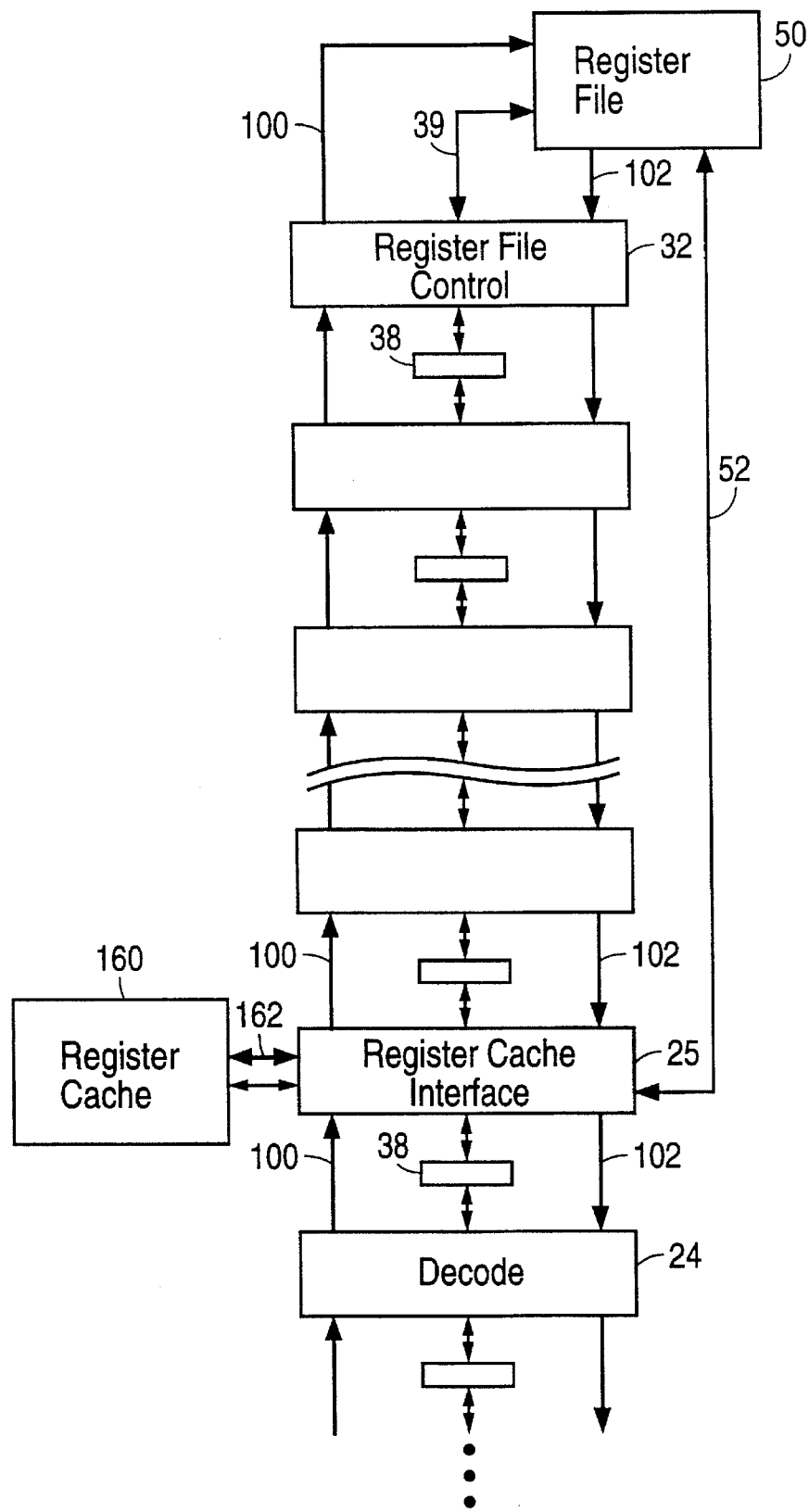
FIG. 6 shows how one or more register caches may be placed in the pipeline.

In FIG. 6, the register cache 160 is connected to a register cache interface stage 25 by means of communication paths 162. The register cache interface stage may connect to the register file by communication path 52 to control its operation. In FIG. 6 a single register cache is illustrated just above the decode stage 24. Although this is a reasonable place to put a register cache it is by no means the only possible location. One or more register caches may be placed wherever in the pipeline it is convenient to place them. Including register caches in no way changes the correctness of the pipeline operation, they merely assist in speeding operation of the machine by reducing the chances that results computed long ago need be sought in the register file.

Each of several register caches may store values for a subset of the registers in the register file. These subsets may or may not overlap. The names or addresses of the particular registers whose latest known value is stored in the cache may be fixed, or the subset stored in a cache may change dynamically. The number of possible configurations is endless. A choice of the most cost effective arrangement for any particular application requires detailed statistical study of the improvement in performance each configuration offers.

Source Match

The register cache functions in two steps as follows. First, the register names or addresses of the valid registers in the register cache are compared with the source register names or addresses in the instruction held in stage 25. Wherever there is a match the instruction may garner values from the cache by copying them.

Destination Match

Second, the destination register names of the instruction are compared with the names of all registers held in the register cache. Any register names that am found to match cause a change in the content or status of the register cache as follows. If the instruction has already computed a value for that destination register, that value is copied into the register cache and marked as valid. If the instruction has not yet computed a value for its destination register, the corresponding register cache entry is marked as invalid.

Result Match

When a result passes the register cache, it too may change the status or contents of the register cache. If a match is found between the name of the result and the name of a register in the register cache, the value from the result is copied into the register cache and that register is marked as valid.

Killing Instructions

Traps

Traps and interrupts are a source of continuing difficulty in the design of modern computers. In a pipeline built according to the present invention, traps and interrupts are easily handled. An instruction that produces a trap treats the trap itself as if it were a special kind of result and inserts it into the results stream. As the trap result passes through the pipeline it kills the instructions that it meets either by removing them from the instruction pipeline or by marking them as invalid.

FIG. 7 is intended to show the action of a trap in the pipeline of the present invention. A pipeline with stages 27 to 41 is illustrated; the left part of each stage shows its instruction content the right part shows its result content. In FIG. 7a, instructions $I_1$ to $I_6$ may be seen in selected stages as they might be when the pipeline is in operation. Stages 27 and 31 happen to contain no instruction. A single ordinary result $R_1$ occupies a position in stage 31.

FIG. 7a shows the status of a typical pipeline after a trap result has passed part way along its length. The instruction $I_2$ that caused the trap may be seen in stage 39. The trap result has moved two stages down to stage 35. The instruction that caused the trap $I_2$ and the others $I_3$ and $I_4$ that have been passed by the trap result have been marked as invalid, as indicated in the figure by the strike through their names. They will subsequently be removed from the pipe.

FIG. 7b shows the status of the same pipeline after the trap result has moved further towards the lower end of the pipeline. The trap has reached stage 29. The result R1 that was traveling down ahead of it has disappeared from sight. The instructions that the trap has passed have all been removed from the pipeline, leaving it largely empty. A new instruction 17has just entered the pipeline but will be killed by the trap as soon as they meet, either in stage 27 if the trap moves first, or in stage 29 if the instruction moves first.

The time separation between FIGS. 8a and 8b is arbitrary. In a particular pipeline design instructions may move faster than or slower than results. Thus the illustrations offered here can be only representative of the operation. Those familiar with the art will easily be able to generate other plausible scenarios of how a trap might interact with particular instructions. The instructions ahead of the trap may have moved further or less depending on the relative speed of those portions of the pipeline and the results path. The trap may meet oncoming instructions easier or later in the pipeline depending on the relative speed of propagation of the trap and the instructions.

When the trap result reaches the instruction fetch unit 34 in FIG. 1 at the bottom of the pipeline, the instruction fetch unit begins to fetch instructions from the trap or interrupt location. Thus all instructions after the trap are removed and will not change the content of the register file. All instructions prior to the trap will, of course, complete in the ordinary fashion and leave their results correctly placed in the register file.

Speculative Execution

In the present invention the same mechanism that permits traps to eliminate unwanted instructions can be used to eliminate instructions improperly issued for speculative execution. After a conditional branch the fetch unit 34 in FIG. 1 will fetch instructions from one or the other of the possible successor instruction streams and issue them speculatively into the pipeline. Each instruction so issued may be marked to identify which of the two outcomes of the conditional branch would render it acceptable, and which would render it obsolete.

The conditional branch instruction proceeds up the pipeline in the usual fashion. The conditional branch instruction may carry with it information indicative of which of its outcomes was chosen for the speculative issue. Note that the conditional branch instruction requires as its source data the value of the data element or register that it is to test. Eventually the conditional branch instruction will garner that value from the result stream. Having done so, the conditional branch instruction is then ready to execute.

Executing the Conditional Branch

Execution of a conditional branch instruction is much like the execution of any other instruction. Based on the instruction type and the source data, the stage that executes the conditional branch determines its outcome. This outcome may be inserted into the results pipe as a special result much like the trap result described above. The conditional outcome result carries with it information used by the stages below to kill selectively all instructions that were improperly issued on speculation. When the conditional branch outcome result reaches the instruction fetch mechanism it delivers the proper address for continued instruction fetching. If the speculation was correct, of course, such a special result may be omitted.

The countersynchronized comparison property of the counterflow pipeline used in the present invention ensures that every result traveling down the pipeline meets every instruction traveling up. Thus the conditional branch result will interact with each and every subsequent instruction until it reaches the instruction fetch mechanism. Therefore no instructions escape deletion if it is required.

Sidings

The description of counterflow pipelines in the companion application includes a discussion of bifurcated pipelines. In this section we use these ideas, sometimes in somewhat specialized form, to show particular features of the present invention.

There are usually several types of arithmetic and logical operations included in any instruction set. In the pipeline built according to the present invention, each such type of instruction may be executed in a separate stage. For example, a single stage may be devoted to shift operations. Because shift operations are relatively infrequent, this stage will serve as a buffer stage for other operations to smooth the flow of information through the pipeline.

Figure 8:
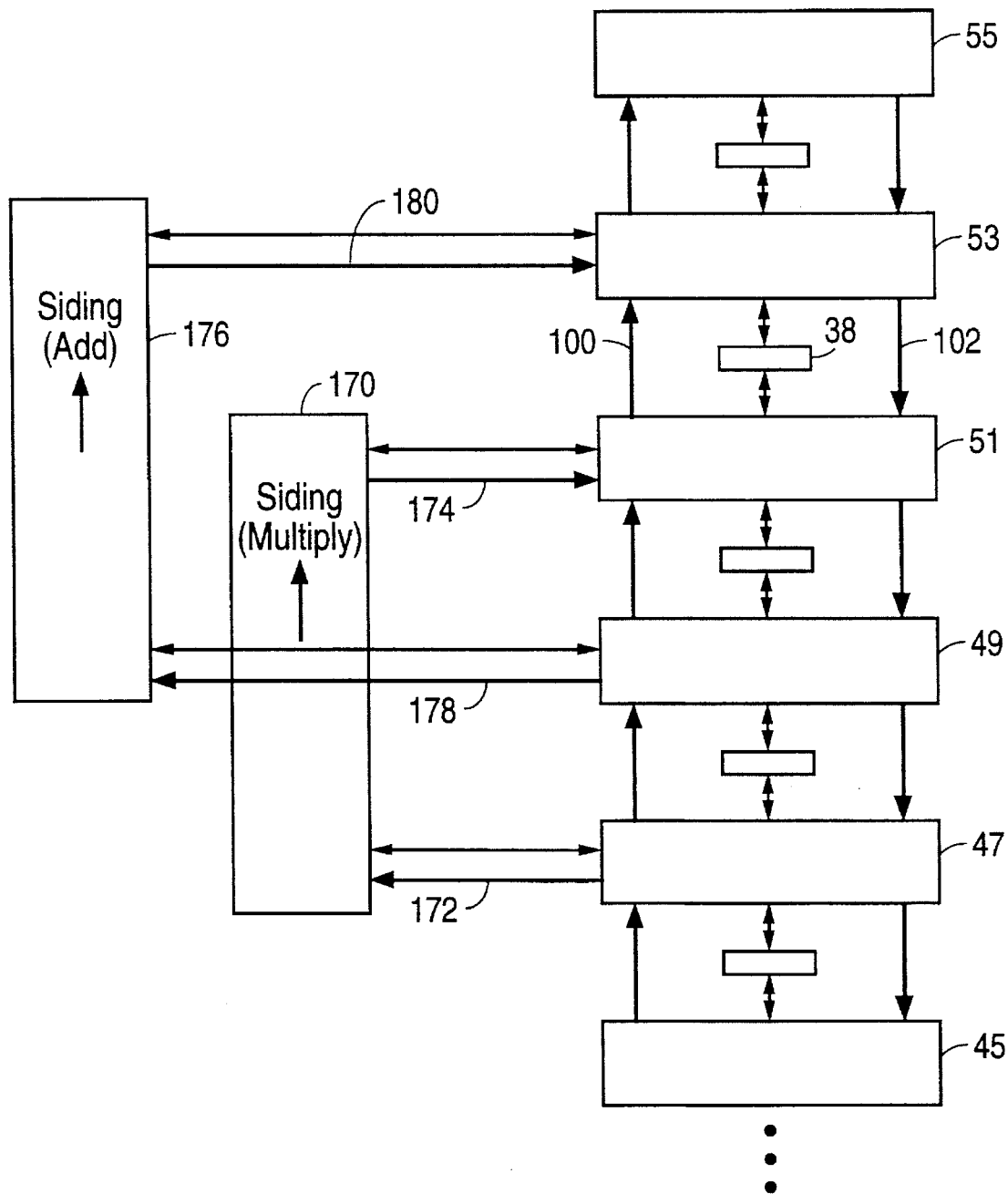
FIG. 8 shows how a computer built in accordance with the present invention might incorporate an arithmetic element.

For more difficult arithmetic operations that take longer, such as multiply, a branching pipeline may be used. FIG. 8 is a block diagram of two arithmetic "sidings" used to perform multiplication and addition. Four pipeline stages are involved, labeled 47, 49, 51 and 53. For illustrative purposes a multiplier 170 and an adder 176 are also shown, although the computation elements involved could perform any desired computation. The multiplier 170 and the adder 176, or whatever other computation elements are involved may themselves be pipelined devices as described in U.S. Pat. No. 5,187,800 or elsewhere. The only important feature of the multiplier and adder is that when given operands at their inputs they eventually produce results at their outputs. If they are themselves pipelined devices, they can accept additional sets of inputs prior to producing their first set of outputs.

As illustrated in FIG. 8, the multiplier extends from stage 47 to stage 51 of the main pipeline and the adder extends from stage 49 to stage 53. It must be understood that the extent of the span, i.e. the number of stages of pipeline over which the computation elements, in this case the adder and the multiplier, extend can be whatever is convenient to the design. The extent will be chosen for most rapid or least costly execution of the functions involved.

Operation of a Single Siding

In use the structure of FIG. 8 operates as follows. A multiply instruction reaching stage 47 will wait until it has garnered all of its source data values. Stage 47, connected to the input of the multiplier, will then launch the multiply operation by sending the source values to the multiplier on data paths 172. This is a modified use of the bifurcated pipeline described in the counterflow pipeline application heretofore mentioned. After doing this, the stage then releases the multiply instruction to move on up the main pipeline through stage 49 to stage 51. In stage 51 the multiply instruction will wait for the multiply device to return a product. Of course in a well designed machine the time required for the instruction to move forward two stages will be well matched to the time required to do the multiply operation, and so little if any wait will be required before the computed product rejoins the instruction. Having received the product in stage 51, the multiply instruction has been executed. Stage 51 then places the answer both in the instruction's destination portion and in the results pipeline.

Operation of Interlocked Sidings

It often happens that multiply instructions are followed by an accumulating addition instruction. Such a program is commonly used to compute the "sum of products" required in many mathematical operations. The accumulating addition instruction will add the newly formed product to a source value stored in a register, say the register named X, and return the sum to its destination register, also named X.

Note how the interlocking arrangement of arithmetic elements shown in FIG. 8 behaves when given a series of such instructions. The multiply is performed as previously described. Stage 51 inserts the product generated by the multiply instruction into the result stream where it moves down and very soon encounters the add instruction. The add instruction cannot have progressed beyond stage 49 of the pipeline because without the result of the multiply instruction it cannot have garnered all of its required source values. When the result of the multiply instruction reaches the add instruction, at stage 49, the stage can launch the addition operation into the adder siding 176 along the data path 178. The add instruction then moves forward through stage 51 to stage 53. When the addition function is complete, stage 53 records the value in the destination part of the add instruction and inserts it into the results stream as well. It travels down the results pipe to the next accumulating add instruction which garners the new value.

In the meantime, the next multiplication instruction may have reached stage 47 and launched its multiply operation. Thus the interlocking arrangement of computation stages permits the next multiply to begin before the previous accumulating addition has finished. This overlapping of operations provides for very high computation rate in the pipeline.

Note that the interleaved structure of FIG. 8 permits very rapid formation of dot product operations that require sequences of multiply and accumulating add operations. Moreover, note that reference to the register file at the top end of the pipeline may be avoided entirely because a proper value of the running sum, which eventually gets stored in register X, is passed down the results pipeline directly from one accumulating add operation to the next without reference to the register file.

The present invention contemplates that each stage of the pipeline may have some special relationship to particular instruction types. Some stages will add, some will refer to memory, some may do logical operations. Some stages may be combination stages that perform several or even all operations. The present invention contemplates that there will be many arrangements of stages with different ordering of operations in stages. For example, an adder stage might precede a shifting stage in one embodiment of the present invention and might follow a shifting stage in another embodiment. The particular order in which stages are able to perform operations should be determined by the details of the instructions that are to be executed. Many different orderings may prove useful for different purposes.

Memory

Figure 9:
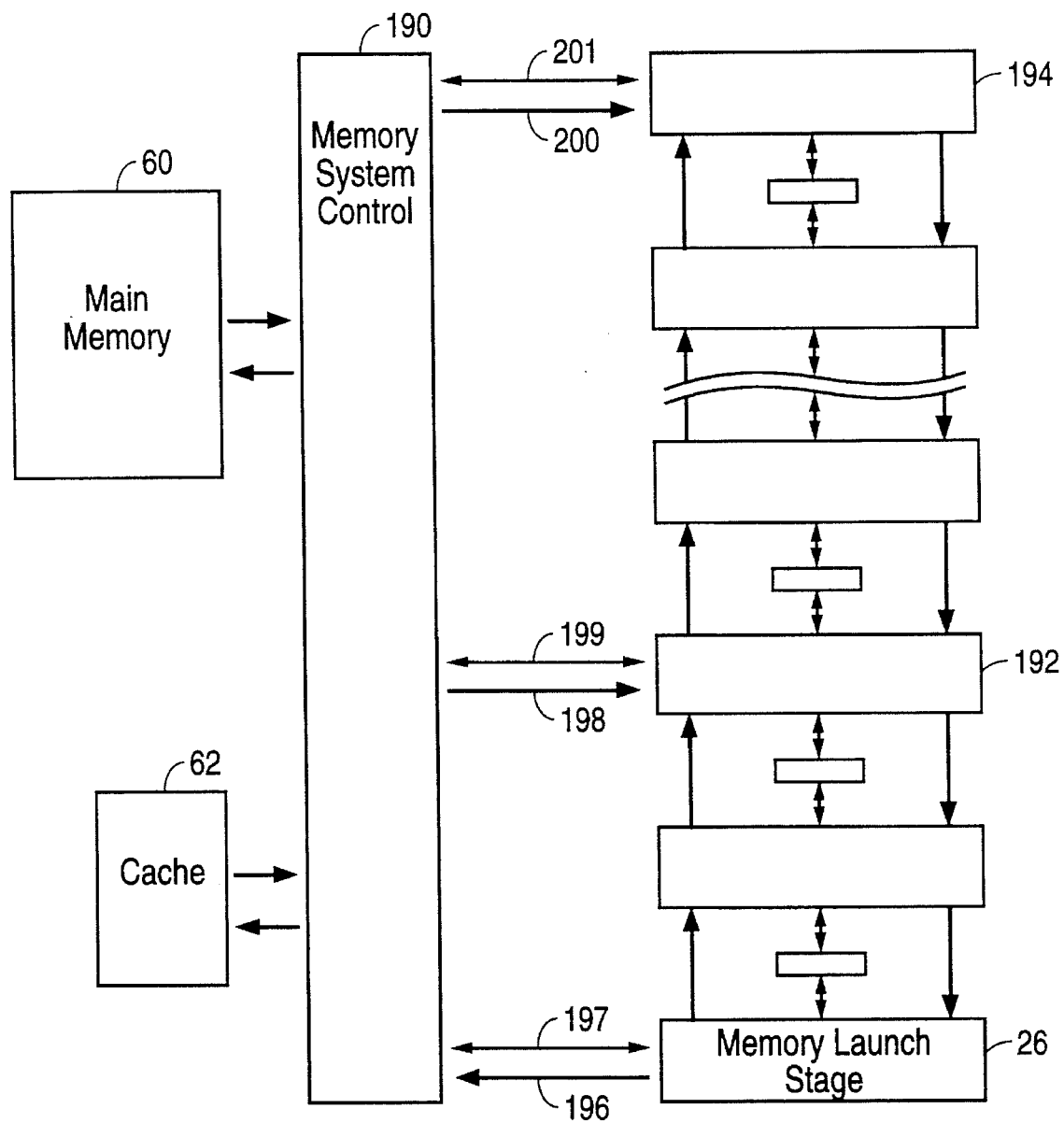
FIG. 9 shows how a computer built in accordance with the present invention might incorporate a memory system.

FIG. 9 shows the preferred connection between the main pipeline of the present invention and a main memory 60. The main memory 60 will be similar in general form to those now in common use and familiar to persons skilled in the art. The memory system consists of a memory system control 190, a cache memory 62 and a main memory 60. The input to the memory system comes from a Data memory launch stage 26 of the main pipeline as was previously shown.

When a memory reference instruction reaches stage 26 of the main pipeline, that stage will deliver the source information from the instruction into the memory system control 190 via communication path 196 and control path 197. As with other such operations, if the source information for the instruction is not yet all available in the instruction, the instruction will wait in stage 26 until its source information has been garnered from the result stream. Having delivered the source information to the memory system, stage 26 permits the memory reference instruction to move up the pipeline. The memory reference instruction will wait at stage 192 for a response from the memory system.

Address Translation

Those familiar with the art will recognize the operation steps of the memory system. The memory system first translates the source information into an address in memory whose contents are desired. There are many translation schemes in use in modern computers; and a designer practicing the present invention may choose one according to the needs of his system. Their purpose, of course, is to translate the address values used in the program into locations in the memory system of the computer.

Cache Lookup

Next the memory system seeks a value of the addressed location in its cache memory. If such a value is found, a "cache hit" is said to have occurred and the required memory operation is nearly finished, as will shortly be described. If such a value is not found, a "cache miss" is said to have occurred, and the memory system must seek the value in the main memory.

Cache Hit

In a conventional computing system, a cache miss is not ordinarily reported back to the computer. In the preferred embodiment of the present invention, however, the instruction that launched the memory operation is waiting at stage 192 of the main pipeline. If a cache hit occurs, data indicative of the value fetched from the cache is returned to stage 192 via path 198 and the memory instruction has been executed. Stage 192 copies that information into the destination part of the instruction and also places it in the result stream. The memory instruction is thereupon complete and need take no further action until it copies its destination values into the register file at the top of the pipeline.

Cache Miss

If a cache miss occurs, the memory system may send to stage 192 via path 198 a message indicating that there was a cache miss. Stage 192 in this case releases the memory instruction to move up the pipe, but the instruction is not yet complete. Such a memory instruction moves up to stage 194 where it again waits for information to come back from the main memory. If access to main memory was successful, the information will be sent to stage 194 via path 200 which will complete the memory operation. Stage 194 will put the returned value in the destination part of the instruction and insert it into the result stream.

Memory Fault

It may happen that the information required is not available in main memory. As soon as this is detected, either as a part of the address translation process or after access to the main memory, a fault message is returned to stage 192 via path 198 or stage 194 via path 200 respectively. In this case a trap must be indicated. As previously explained, stage 192 or stage 194 will initiate the trap by placing a special trap result in the result stream.

Advantage of Siding Structure

One advantage of the preferred embodiment structure is that it permits several memory references to be outstanding at once. As soon as a memory reference instruction has left stage 26 of the main pipeline, another one can take its place. The memory system can process these references in pipeline fashion, containing several partially processed references at once. Those that happen to have cache hits may actually complete in stage 192. Those that have a cache miss and have to access main memory will take longer and will return values at stage 194. Notice that several instructions that happen to get cache hits can complete while one or more references to main memory are underway. The simple structure of the main pipeline ensures that the data fetched for each instruction reaches only such other instructions that it would have reached had the instructions been performed in strict sequence.

Floating Point

In many instruction sets, and particularly in the SPARC instruction set, a distinction is made between fixed point and floating point arithmetic operations. Separate register sets are used, separate condition codes are used, and so forth.

Figure 10:
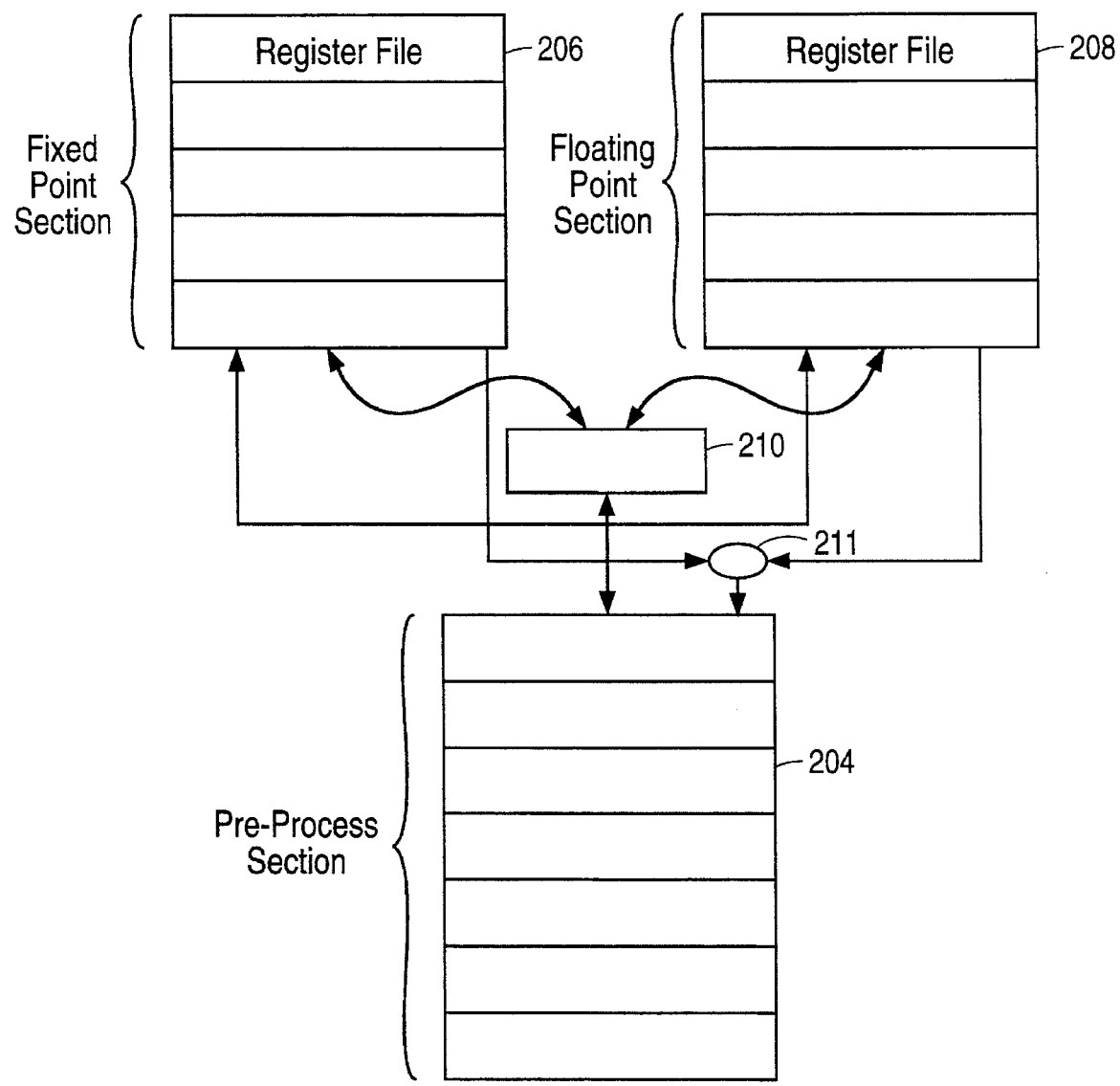
FIG. 10 shows a branching pipeline for separating floating point operations and register file from fixed point operations and register file.

In computers where such a distinction is made between fixed and floating point operations, a bifurcated pipeline as shown in FIG. 10 can be used to advantage. The pipeline illustrated is divided into three parts. The first section 204 is used in common by both fixed point and floating point One of the two upper sections, say 206, is used for fixed point operations and the other 208 for floating point operations. At the point of bifurcation a control mechanism 210 sends the proper types of operations up their respective pipeline sections.

At the point of bifurcation fixed point operations am sent up the fixed point pipeline and floating point operations am sent up the floating point pipeline. This is a data dependent kind of bifurcation as described in the Counterflow Pipelines companion disclosure. Results coming from the two separate upper pipelines may be combined into the lower result stream in any of a number of ways by the combining device 211. First come first served will be suitable. The particular choice is immaterial, however, because the results will refer to different registers and therefore need not be ordered in any particular way.

Figure 11:
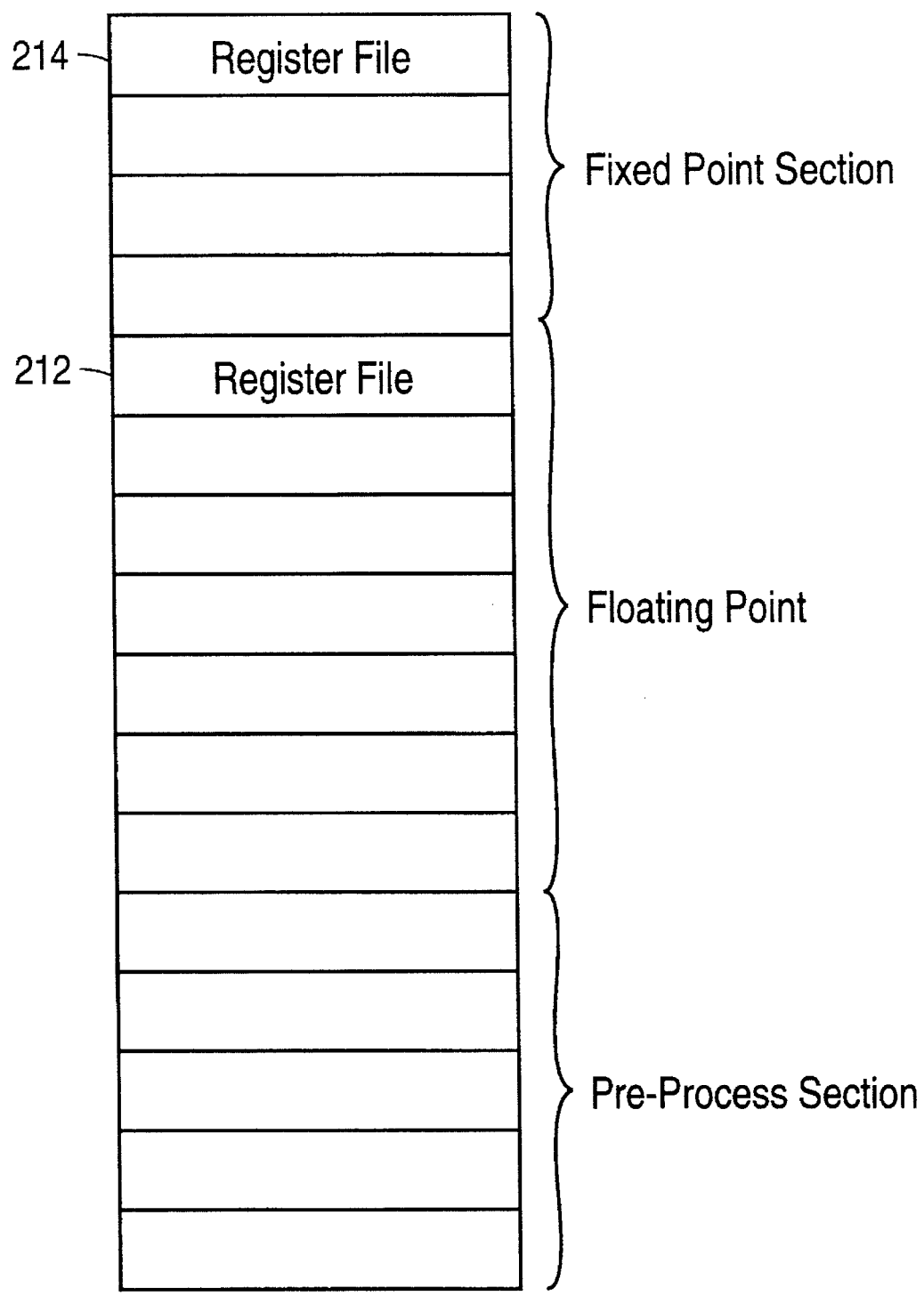
FIG. 11 shows a single pipeline in which separate register files and separate stages are used to separate floating point operations from fixed point operations.

An alternative structure for implementing floating point is shown in FIG. 11. Here a single pipeline serves two register files, one for floating point operations 212 and the other for fixed point operations 214. By the time instructions reach the first register file 212 any floating point operations will be complete. Fixed point operations may have garnered some of their source operands, but will not yet have been executed. The upper portion of the pipeline between stage 212 and stage 214 contains the circuits required to do the fixed point operations.

This form of separation is particularly useful in computer families where some members of the family can execute a particular kind of instruction and others can not. The simpler members of the family can be built with just the outer portions of FIG. 11, while the more powerful ones contain the additional stages. Many varieties of special operations might be used in addition to floating point operations. For example, graphics operations, signal processing operations, or special logical functions might be provided.

Description of Preferred Embodiment

The preferred embodiment of the present invention consists of a bifurcated counterflow pipeline as illustrated in FIG. 10.

Connected to this bifurcated counterflow pipeline are sidings for arithmetic, as illustrated in FIG. 8, and for memory as illustrated in FIG. 9. Arithmetic sidings for fixed point multiplication and for floating point multiplication and addition are included.

The preferred embodiment of this invention uses the asynchronous form of communication protocol outlined in the companion application, Counterflow Pipelines as illustrated in FIG. 11 thereof.

The asynchronous communication protocol is preferred because it makes the elastic form of the pipeline simple, thus permitting results to be inserted into the results pipeline whenever and wherever required. It is also preferred because it permits the circuits to run as fast as possible considering the data that must be communicated. In particular, when the pipeline is empty it provides for maximum transfer rate of the data.

In the preferred form of the present invention each stage does a specialized part of the processing required. Addition is separated into a separate stage from logical operations because addition requires a carry operation that may take longer than other operations.

Of course, one skilled in the art will appreciate numerous alternative approaches and application for utilizing the present invention. Accordingly the scope of the invention is not intended to be limited to the detailed implementations described above, but rather by the following claims.

We claim:

1. A computer system capable of executing instruction packages defining source identifiers having source values associated therewith and destination identifiers having destination values associated therewith, comprising:

a bi-directional pipeline having a first data flow path and a second data flow path running counter to the first data flow path;

an instruction launch circuit configured to launch the instruction packages into the first data flow path at a first end of the bi-directional pipeline;

a result package generation circuit configured to generate result packages, certain ones of the result packages having a destination identifier and an associated result value, the result package generation circuit further configured to insert the result packages into the second data flow path of the bi-directional pipeline; and a compare circuit for to compare each one of the instruction packages flowing in the first data flow path with each encountered one of the result packages flowing through the second data flow path of the bi-directional pipeline.

2. The computer system of claim 1, wherein the compare circuit compares the source identifier of the instruction package with the destination identifier of the result package.

3. The computer system of claim 2, further comprising a garnering circuit configured to provide to the instruction package the destination value associated with the destination identifier of the result package in the event the compare circuit determines that the destination identifier of the result package and the source identifier of the instruction package are identical.

4. The computer system of claim 1, wherein the compare circuit compares the destination identifier of the instruction package with the destination identifier of the result package.

5. The computer system of claim 4, further comprising a nullify circuit configured to nullify the destination value of the result package in the event the compare circuit determines that the destination identifier of the result package and the destination identifier of the instruction package are identical.

6. The computer system of claim 1, further comprising an execution circuit configured to execute the instruction packages flowing in the first data flow path of the bi-directional pipeline.

7. The computer system of claim 6, wherein the result package generation circuit generates the result packages from the executed ones of the instruction packages flowing in the first data flow path of the bi-directional pipeline.

8. The computer system of claim 1, further comprising a first control circuit to maintain the instruction packages in a sequence that prevents them from exchanging relative position in the first data flow path of the bi-directional pipeline.

9. The computer system of claim 1, further comprising a control circuit for maintaining the result packages that contain the same destination identifiers in a sequence that prevents them from exchanging relative position in the second data flow path of the bi-directional pipeline.

10. The computer system of claim 1, wherein certain ones of the instruction packages further include a validity flag to identifying the validity of the source value contained therein.

11. The computer system of claim 1, wherein certain ones of the instruction packages further include a result field to store the result value generated after execution.

12. The computer system of claim 1, wherein certain ones of the result packages further include a validity flag to identify the validity of the result value therein.

13. The computer system of claim 1, further comprising a memory, coupled to the bi-directional pipeline, to provide certain ones of the source values identified by the source identifiers to the instruction packages and to store the result values identified by the destination identifiers of certain ones of the result packages.

14. The computer system of claim 13, wherein the memory is a register file.

15. The computer system of claim 1, wherein the result package generation circuit injects the result packages into the second data flow path at a second end of the bi-directional pipeline, opposite the first end of the bi-directional pipeline.

16. The computer system of claim 1, wherein the result package generation circuit is configured to inject the result packages into the second data flow path at an intermediate point in the bi-directional pipeline.

17. The computer system of claim 1, wherein the bi-directional pipeline includes a plurality of stages.

18. The computer system of claim 17, wherein each of the plurality of stages in the bi-directional pipeline performs one of several processing functions.

19. The computer system of claim 18, wherein selected ones of the plurality of stages in the bi-directional pipeline perform the same one of the several processing functions.

20. The computer system of claim 1, further comprising external devices coupled to the bi-directional pipeline for acquiring or supplying information to the bi-directional pipeline.

21. The computer system of claim 1, further comprising a branch in the bi-directional pipeline to facilitate execution of different types of the instruction packages.

22. The computer system of claim 21, wherein the different types of the instruction packages include at least one of the following operations: fixed point arithmetic; floating point arithmetic; or memory access.

23. The computer system of claim 1, further comprising a siding coupled at a first stage and at a second stage of the bi-directional pipeline.

24. The computer system of claim 23, further comprising two of the sidings, wherein the two of the sidings are interconnected.

25. The computer system of claim 23, wherein the siding is used to perform at least one of the following operations: arithmetic; memory access; register access; or cache access.

26. The computer system of claim 23, wherein the siding is connected to communicate with the instruction packages flowing in the first data flow path in the bi-directional pipeline.

27. The computer system of claim 1, further comprising a cache coupled to the bi-directional pipeline.

28. The computer system of claim 27, wherein the cache is an instruction cache.

29. The computer system of claim 27, wherein the cache is a data cache.

30. A method of providing a computer system for executing instruction packages defining source identifiers having source values associated therewith and destination identifiers having destination values associated therewith, comprising the steps of:

providing a bi-directional pipeline having a first data flow path and a second data flow path running counter to the first data flow path;

providing an instruction launch circuit for launching the instruction packages into the first data flow path at a first end of the bi-directional pipeline;

providing a result package generation circuit for generating result packages, certain ones of the result packages having a destination identifier and an associated result value, the result package generation circuit further for inserting the result packages into the second data flow path of the bi-directional pipeline; and providing a compare circuit for comparing each one of the instruction packages flowing in the first data flow path with each encountered one of the result packages flowing through the second data flow path of the bi-directional pipeline.

31. A method of operating a computer system that executes instruction packages that define source identifiers having source values associated therewith and destination identifiers having destination values associated therewith, comprising the steps of:

launching the instruction packages into a first data flow path at a first end of bi-directional pipeline;

generating result packages, certain ones of the result packages having a destination identifier and an associated result value, by executing the instruction packages in the first data flow path of the bi-directional pipeline;

inserting the result packages into a second data flow path, flowing counter to the first data flow path, in the bi-directional pipeline; and comparing each one of the instruction packages flowing in the first data flow path with each encountered one of the result packages flowing through the second data flow path of the bi-directional pipeline.

32. The method claim 31, wherein the compare step further includes the step of comparing the source identifier of the instruction package with the destination identifier of the result package.

33. The method of claim 32, further comprising the step of garnering and providing to the instruction package the destination value associated with the destination identifier of the result package in the event the comparison steps determine that the destination identifier of the result package and the source identifier of the instruction package are identical.

34. The method of claim 31, wherein the compare step further comprises the step of comparing the destination identifier of the instruction package with the destination identifier of the result package.

35. The method of claim 34, further comprising the step of nullifying the destination value of the result package in the event the comparison steps determine that the destination identifier of the result package and the destination identifier of the instruction package are identical.

36. The method of claim 31, further comprising the step of executing the instruction packages flowing in the first data flow path of the bi-directional pipeline.

37. The method claim 36, further comprising the step of generating the result packages from the executed the instruction packages.

38. The method of claim 31, further comprising the step of maintaining the instruction packages in a first sequence that prevents them from exchanging relative position in the first data flow path of the bi-directional pipeline.

39. The method of claim 31, further comprising the step of maintaining the result packages that contain the same destination identifier in a second sequence that prevents them from exchanging relative position in the second data flow path of the bi-directional pipeline.

40. The method of claim 31, further comprising the step of identifying the validity of the source value the instruction packages.

41. The method claim 31, further comprising the step of storing in certain ones of the instruction packages a result value after the certain ones of the instruction packages have been executed in the bi-directional pipeline.

42. The method of claim 31, further comprising the step identifying the validity the result value in the certain ones of the result packages respectively with a validity flag.

43. The method of claim 31, further comprising the step of providing certain ones of the source values for the instruction packages from a register file.

44. The method of claim 31, wherein the result values of certain ones of the result packages are stored in a register file.

45. The computer system of claim 31, further comprising the step of injecting the result packages into the second data flow path at a second end of the bi-directional pipeline, opposite the first end of the bi-directional pipeline.

46. The computer system of claim 31, further comprising the step of injecting the result packages into the second data flow path at an intermediate point of the bi-directional pipeline.

47. The method of claim 31, further comprising the step of performing one of several processing functions at each of the plurality of stages in the bi-directional pipeline.

48. The method of claim 47, further comprising the step of performing the same one of the several processing functions at selected ones of the plurality of stages in the bi-directional pipeline.

49. The method of claim 48, further comprising the step of executing one of the, instruction packages, defining one of the processing functions, at the first available stage capable of executing that processing function in the bi-directional pipeline after the instruction has obtained the its values it needs to be executed.

50. The method of claim 31, further comprising the steps of acquiring or supplying information from and to external devices coupled to the bi-directional pipeline.

51. The method as set forth in claim 31, further comprising the step of handling condition codes by treating them as one of the result values associated with one of the result packages in the bi-directional pipeline.

52. The method as set forth in claim 31, further comprising the step of handling exceptions such as traps and interrupts by inserting a nullify result into the second data flow path so that instruction packages encountered by the nullify result are removed from the first data flow path of instruction packages in response to the exception.

53. The method as set forth in claim 31, further comprising the step of providing branches in the bi-directional pipeline to facilitate execution of different types of instruction packages.

54. The method as set forth in claim 53, further comprising the step of providing branches in said pipeline to facilitate execution of fixed point arithmetic operations, floating point arithmetic operations, or memory access operations.

55. The method as set forth in claim 31, further comprising the step of performing speculative execution of stream of the instruction packages, including the step of removing instruction packages in the first data flow path in the event the speculative execution proves to be incorrect.

56. The method as set forth in claim 31, further comprising the step of including Condition Code and/or Program Status Word information in the result packages flowing down the second data flow path.

57. The method as set forth in claim 31, further comprising the steps of:

providing a siding that connects in a first location and a second location to the bi-directional pipeline;

supplying information at the siding at the first location;

generating a siding package from the supplied information;

causing said siding package to flow in the siding in parallel with the bi-directional pipeline; and inserting the siding package into the bi-directional pipeline at the second location along the bi-directional pipeline.

58. The method as set forth in claim 57, further comprising the steps of using the siding for one of the following operations, including: arithmetic; memory access; register access; or cache access.

59. The method as set forth in claim 57, further comprising the step of connecting the siding to a second siding.

60. The computer system of claim 23, wherein the siding is connected to communicate with the flow of the result packages in the second data flow path in the bi-directional pipeline.

* * * * *